US012722150B2

(12) United States Patent
Kunsch

(10) Patent No.: US 12,722,150 B2
(45) Date of Patent: Sep. 1, 2026

(54) PIPETTE TIP FAMILY COMPRISING PIPETTE TIPS FOR USE WITH PIPETTES OF A PIPETTE FAMILY AND PIPETTE FAMILY COMPRISING PIPETTES FOR USE WITH PIPETTE TIPS OF A PIPETTE TIP FAMILY

(71) Applicant: Eppendorf SE, Hamburg (DE)

(72) Inventor: Matthias Kunsch, Hamburg (DE)

(73) Assignee: EPPENDORF SE, Hamburg (DE)

( * ) Notice: Subject to any disclaimer, the term of this patent is extended or adjusted under 35 U.S.C. 154(b) by 881 days.

(21) Appl. No.: 17/782,866

(22) PCT Filed: Dec. 4, 2020

(86) PCT No.: PCT/EP2020/084608
§ 371 (c)(1),
(2) Date: Jun. 6, 2022

(87) PCT Pub. No.: WO2021/110902
PCT Pub. Date: Jun. 10, 2021

(65) Prior Publication Data

US 2022/0401945 A1 Dec. 22, 2022

(30) Foreign Application Priority Data

Dec. 6, 2019 (EP) .................................... 19214095

(51) Int. Cl.
*B01L 3/02* (2006.01)

(52) U.S. Cl.
CPC ........... *B01L 3/0275* (2013.01); *B01L 3/0217* (2013.01); *B01L 2200/023* (2013.01); *B01L 2400/0478* (2013.01)

(58) Field of Classification Search
None
See application file for complete search history.

(56) References Cited

U.S. PATENT DOCUMENTS 5,192,511 A * 3/1993 Roach .................. B01L 3/0279
73/864.11

FOREIGN PATENT DOCUMENTS

DE 102009034897 A1 2/2011
DE 202017101007 U1 5/2018
(Continued)

OTHER PUBLICATIONS

CN 202080083190.1; Filing Date Dec. 4, 2020; CN Office Action; date of mailing Mar. 18, 2023 (9 pages).
(Continued)

*Primary Examiner* — Maris R Kessel
*Assistant Examiner* — May Leung Chiu
(74) *Attorney, Agent, or Firm* — Barclay Damon LLP

(57) ABSTRACT

A pipette tip family includes a plurality of pipette tips each including a tip cylinder, each of the plurality of pipette tips further includes a hollow body including a bottom end and a top end such that the bottom end defines a tip opening and the top end defines a mounting opening, a seating region is configured to clamp to the spigot and a cylindrical plunger travel path is defined between the tip opening and the seating region, a tip plunger includes a plunger guided along the plunger travel path and a plunger rod comprising a top end, the plurality of pipette tips of each subfamily are configured to be used for pipetting with pipettes of a pipette type matched thereto and are not configured to be used with pipettes of a pipette type not matched thereto.

8 Claims, 15 Drawing Sheets

(56) References Cited

FOREIGN PATENT DOCUMENTS

| | | | |
|---|---|---|---|
| EP | 0078724 | A1 | 5/1983 |
| EP | 3560596 | A1 | 10/2019 |
| WO | 2019206879 | A1 | 10/2019 |

OTHER PUBLICATIONS

CN 202080083190.1; Filing Date Dec. 4, 2020; English translation of CN Office Action; date of mailing Mar. 18, 2023 (9 pages).

PCT/EP2020/084608; International Filing Date Dec. 4, 2020; International Search Report and Written Opinion; date of mailing Apr. 19, 2021 (13 pages).

PCT/EP2020/084608; International Filing Date Dec. 4, 2020; English translation of Written Opinion; date of mailing Apr. 19, 2021 (2 pages).

* cited by examiner 66
73
4
75
8,9
62
3
51
52
46
47
44,45
43
41
32,33
18
2
1

66
4
10
62
3
51
52
46
47
43
41
18
44,45
42
1

66
4
10
62
51
47
52
44,45
43
41
42
18
1

PIPETTE TIP FAMILY COMPRISING PIPETTE TIPS FOR USE WITH PIPETTES OF A PIPETTE FAMILY AND PIPETTE FAMILY COMPRISING PIPETTES FOR USE WITH PIPETTE TIPS OF A PIPETTE TIP FAMILY

CROSS REFERENCE TO RELATED INVENTION

This application is a national stage application pursuant to 35 U.S.C. § 371 of International Application No. PCT/EP2020/084608, filed on Dec. 4, 2020, which claims priority to, and benefit of, European Patent Application No. 19214095.2, filed Dec. 6, 2019, the entire contents of which are hereby incorporated by reference.

TECHNOLOGICAL FIELD

The invention relates to a pipette tip family comprising pipette tips for use with pipettes of a pipette family and a pipette family comprising pipettes for use with pipette tips of a pipette tip family.

BACKGROUND

Pipettes are utilized in particular in scientific and industrial laboratories in medical, molecular biological and pharmaceutical areas of application for dosing selected volumes of liquids. The liquids can in particular be homogeneous (single phase) liquids consisting of a single liquid component, or a homogeneous mixture of a plurality of liquid components (solutions). Furthermore, the liquids can be heterogeneous (multiphase) mixtures of a liquid with another liquid (emulsions), or a solid (suspensions).

Pipettes have a stick-shaped pipette housing with a spigot (attachment) on the bottom end for clamping on a pipette tip. The spigot is frequently a conical, cylindrical or sectionally conical and cylindrical projection, and is also termed a “working cone”. A pipette tip is a hollow tube with a tip opening in the bottom end and a mounting opening in the top end with which the pipette tip can be clamped to the spigot. The liquid is drawn into the pipette tip and discharged therefrom. The drawing and discharging of liquid is controlled by means of the pipette. Fixed volume pipettes serve to pipette constant volumes. With variable pipettes, the volume to be dosed is adjustable. A mechanical counter is used to display the set volume. To set the volume, the stroke of a drive apparatus is adjustable by means of a setting apparatus that is coupled to the counter. After use, the pipette tip is detached from the attachment, and can be exchanged for a fresh pipette tip. In this way, cross-contaminations in subsequent pipetting can be avoided.

Air cushion pipettes have a plunger/cylinder system in the pipette housing that is connected by a channel to a through-hole in the spigot. Pipette tips for air cushion pipettes (air cushion pipette tips) do not have an integrated plunger. By displacing the plunger by means of the drive apparatus in the cylinder, an air cushion is moved for aspirating liquid into a pipette tip clamped onto the spigot, and ejecting it therefrom. A disadvantage with air cushion pipettes are dosing errors arising from the change in the length of the air cushion from the weight of the aspirated liquid, and the differences in temperature, air pressure and humidity. Contamination of the pipette with aerosols can also be problematic.

Air cushion pipettes are offered in different sizes with only one respectively fitting air cushion pipette tip having a certain nominal volume or a plurality of air cushion pipette tips fitting thereon, having different very similar nominal volumes. The identification of air cushion pipettes and air cushion pipette tips with a color code is known, in order to facilitate correct correlation. In this context, there is a risk of misinterpretation by the user, such that the user uses an incorrect combination of a pipette with a pipette tip.

U.S. Pat. No. 6,749,812 B2 describes an air cushion pipette having an automatic tip ejector that has a spring-loaded attachment for mounting pipette tips and a spring-loaded ejector sleeve guided thereupon. Furthermore, a tip recognition of pipette tips is present in which different tip types have a different basic configuration. In this tip recognition, different pipette tip types are recognized based on a difference in the relative displacement of the attachment relative to the ejector sleeve, said difference being detected by means of electronic sensors.

Positive displacement pipettes are used with pipette tips with integrated plungers (positive displacement pipette tips). This type of pipette has a spigot for fastening the pipette tip, and a drive apparatus that can be coupled to the integrated plunger (tip plunger) for moving the plunger. The plunger comes directly into contact with the liquid so that the effects of an air cushion do not exist. Positive displacement pipettes are in particular suitable for dosing liquids with a high vapor pressure, high viscosity or high density, and applications in molecular biology in which freedom from aerosols is important in order to avoid contamination. Air cushion or positive displacement pipette tips for single use or reuse consist of plastic or of glass.

In the Biomaster® 4830 positive displacement pipette by Eppendorf AG, the drive apparatus has a stroke rod to displace a plunger in a pipette tip that has a hollow lower stroke rod part, and an upper stroke rod part inserted from above into the lower stroke rod part. The upper stroke rod part is connected to an operating element that projects out of the top end of the pipette housing. A Mastertip® pipette tip by Eppendorf AG with a nominal volume of 20 µl can be clamped onto a spigot of the pipette. By pressing the operating element, the stroke rod can be shifted downward so that a top end of the plunger rod of a tip plunger of the pipette tip is pressed into the lower stroke rod part. When displacing the stroke rod downward to a lower hard stop, a spring apparatus is pretensioned. After the operating element is released, the spring apparatus displaces the stroke rod to an upper hard stop, wherein the tip plunger is entrained and liquid can be aspirated into the pipette tip. The aspirated liquid can be discharged by again pressing the operating element to the lower hard stop. To release the pipette tip, the user must press with greater force on the operating element so that another spring apparatus compresses, the upper stroke rod part in the lower stroke rod part is displaced downward and presses the plunger out of the lower stroke rod part, and presses the pipette tip off of the spigot. The Biomaster® pipette and the Mastertip® pipette tips are designed for pipetting in the volume range of 1 µl to 20 µl.

EP 3 560 596 A1 describes a pipette tip family comprising at least two pipette tips of different types, wherein each pipette tip has a tip opening in the bottom end, a mounting opening in the top end, a collar having the mounting opening with a characteristic height for the type of pipette tip in the top end and, on the inner circumference of the collar, a seating region for clamping onto a spigot having a certain contour of a pipette. Pipette tips of different types can be clamped with their seating region onto the same spigot, so that with their collars they stand at different heights on the spigot. Pipette tips with a nominal volume of 10 µl and 100

μl have a bead inside the collar. In both embodiments, the bead adjoins a spigot of a pipette equally once the pipette tip is clamped securely thereupon. In this context, the pipette tip with a nominal volume of 10 μl adjoins with an inner step inside its collar a shoulder on the spigot. The upper edge of the collar projecting above the inner step shifts a slider of the pipette upward, by which a partial stroke is pushed into a different position between two counter rollers of a mechanical counter. With the upper edge of its collar, the 100 μl pipette tip meets the shoulder of the spigot, so that the slider is not shifted and the display of the mechanical counter remains unchanged. In this manner, different displays of the counter are set by the collars of different heights. With regard to both pipette tips, the top end of the plunger rod is the same distance from the bead, and is pressed into the stroke rod of the pipette to the same extent once the pipette tip with the bead is securely clamped to the spigot.

EP 2 574 402 B1 and DE 199 48 818 A1 describe syringes with an encoding, and dosing devices with sensors that sense the encoding of the syringe and output a display dependent upon the syringe type. The syringes are held by means of gripper levers or latches against a syringe flange of the syringe cylinder and grooves of the syringe plunger, and are not clamped onto a spigot or clamped into a hollow stroke rod like the direct displacement pipette tips.

Against this backdrop, the invention has the object of providing direct displacement pipette tips and air cushion pipette tips with an expanded range of application. In this regard, usage errors are to be prevented, as far as possible.

BRIEF SUMMARY OF THE INVENTION

The pipette tip family according to the invention comprises pipette tips of different pipette tip types for use with pipettes of different pipette types of a pipette family. Each pipette tip comprises a tip cylinder and a tip plunger. The tip cylinder has a hollow body with a tip opening in the bottom end, a mounting opening in the top end, a seating region on the inner circumference for clamping onto a clamping region of a spigot of a pipette, and a cylindrical plunger travel path between the tip opening and seating region. The tip plunger has a plunger guided sealingly in the plunger travel path, and a plunger rod projecting upward for clamping in an axial bore having a hole in the bottom end of a stroke rod of a pipette. Pipette tips of the same subfamily are pipette tips of the same tip type or pipette tips of different tip types, wherein the top ends of the plunger rods in the respectively deepest position of the tip plunger have the same positions relative to the seating region. Pipette tips of different subfamilies have the top ends of the plunger rods in the respectively deepest position of the tip plunger at different positions relative to the seating region, so that the pipette tips of each subfamily can be used for pipetting with pipettes of a pipette type matched thereto and not with pipettes of a pipette type not matched thereto.

An embodiment of a pipette family according to the invention comprises pipettes of different pipette types for use with pipette tips of different tip types of a pipette tip family, wherein each pipette comprises the following features: (1) a stick-shaped pipette housing; (2) a spigot at the bottom end of the pipette housing having a clamping region on the outer circumference for clamping a seating region on the inner circumference of a tip cylinder of a pipette tip having a mounting opening in the top end, and with a through-bore for inserting a plunger rod of a tip plunger of the pipette tip; (3) a drive apparatus comprising a stroke rod oriented to the through-bore, said stroke rod being displaceably guided in the longitudinal direction of the spigot, having an axial bore and a hole in the bottom end for introducing the top end of the tip plunger and a clamping apparatus for securely clamping the top end of the tip plunger in the bore, and an operating element protruding from the pipette housing that is displaceable relative to the pipette housing and which is coupled to the stroke rod for displacing a plunger of the tip plunger guided sealingly in a plunger travel path between a tip opening in the bottom end and the seating region of the tip cylinder; (4) an elongated first sensing element that is upwardly displaceable inside the axial bore of the stroke rod when the operating element is unloaded for sensing the top end of a tip plunger of a pipette tip pushed onto the spigot at the mounting opening, said tip plunger being inserted into the axial bore; and (5) a control unit coupled to the first sensing element that is designed to place the pipette into a state enabling pipetting upon sensing a plunger rod of a pipette tip of a subfamily of the pipette tip family that is matched to the pipette type of the pipette, wherein the top ends of the plunger rods in the respectively deepest position of the plunger rod have the same positions relative to the seating region, and to place it into a state not enabling pipetting upon sensing a plunger rod of a pipette tip of a subfamily not matched to the pipette type, wherein the top ends of the plunger rods at the respectively deepest position of the tip plunger have different positions relative to the seating region than to the pipette tips of the subfamily matched to the pipette tip.

In an embodiment of a pipette tip family according to the invention, the range of application is expanded in that these pipette tips with integrated plungers comprise different tip types. For example in a pipette tip family wherein the different tip types differ from each other by the nominal volume, the range of the volume that can be pipetted is enlarged and/or the precision with which the different volumes can be pipetted is improved. Additionally, the range of application of the pipette tip family is expanded in that it comprises a plurality of subfamilies that are respectively formed by pipette tips of the same tip type or pipette tips of different tip types, wherein the top ends of the plunger rods in the respectively deepest position of the plunger have the same positions relative to the seating region. In this way the use of pipette tips of different tip types with the same pipettes of a pipette type matched thereto is enabled.

In an embodiment of a pipette family according to the invention, the range of application is expanded in that these pipettes comprise different types. For example in a pipette family wherein the different pipette types differ from each other in that they can be used with pipette tips having different nominal volumes, the range of the volume that can be pipetted is enlarged and/or the precision with which the different volumes can be pipetted is improved. Additionally the range of application is expanded in that each pipette of a certain pipette type can be used with all pipette tips of a subfamily matched thereto. This allows pipette tips of different tip types to be used with the same pipette.

Ambiguity errors, incorrect dosing and other application errors are prevented in that the pipette tips of each subfamily can only be used with pipettes of a pipette type matched thereto, and pipettes of a certain pipette type can only be used with pipette tips of a subfamily matched thereto.

Pipetting refers to drawing fluid into pipette tips and dispensing fluid from pipette tips with the aid of pipettes. Use of pipette tips with pipettes refers to holding pipette tips on pipettes, moving of pipette tips held on pipettes by moving pipettes, and pipetting with the aid of pipette tips and pipettes.

According to another embodiment, the pipette tips of different tip types differ from each other by one or more of the following features: nominal volume, shape, dimensions, material, surface coating, without or with surface treatment, electrically insulating or electrically conducting, degree of purity. The invention expands the application range of pipette tips, especially with regard to the above-mentioned features, and simultaneously prevents application errors.

According to another embodiment, the pipette tips have a collar with the mounting opening in the top end and the seating region on the inner circumference of the collar. The collar is especially advantageous for holding pipette tips on a holder (rack) during storage, transport, and clamping pipette tips onto the spigots of pipettes. Furthermore the collar can be advantageous for precise positioning of the pipette tip on the spigot and for separating the pipette tip from the spigot.

Another embodiment comprises at least one subfamily with pipette tips of different tip types, wherein each of these pipette tips has a collar with a characteristic height for the tip type, and these pipette tips are designed to be clamped with their seating region onto the inner circumference of the collar on the same clamping region of a spigot of a pipette of the same pipette type, so that with their collars, they stand at different heights on the spigot. The height of the collar is preferably the distance in the vertical direction from the upper edge of the collar to the seating region of the pipette tip. In this embodiment, pipette tips with collars of different heights can control a sensing element of a sensing apparatus of the pipette so that the sensing apparatus sets a display of a display apparatus of the pipette dependent upon the type of pipette tip. Consequently during clamping of pipette tips of different tip types onto the spigot of the pipette, the display is set such that it refers to the tip type of the respectively mounted pipette tip. In particular this allows the volume displayed by the pipette to be set to the nominal volume of a mounted pipette tip. Pipette tips with collars of different heights are described in the Description, as well as in the exemplary embodiments of EP 18 168 763.3 (EP 3 560 596 A1). Pipettes with a sensing apparatus for sensing collars of different heights are further described in this patent application. In this regard, reference is made to the above-mentioned patent application, the content of which is hereby incorporated into this application.

According to another embodiment, the nominal volumes of pipette tips of different types for use with pipettes of the same pipette type matched thereto differ from each other by one or more decimal powers. This is advantageous for autonomously setting a volume display by means of a mechanical counter by adjusting a marking to different decimal places of the counter.

According to another embodiment, the seating region of the pipette tips has a circumferential bead on the inner circumference of the tip cylinder for snap-fitting with a circumferential annular groove of the clamping region on the outer circumference of the spigot of a pipette, and/or the seating region of the pipette tips has a circumferential annular groove on the inner circumference for snap-fitting with a circumferential bead of the clamping region on the outer circumference of the spigot of a pipette. In this way the pipette tips are held securely on the spigot. Furthermore compliance with a defined position of the pipette tips on the spigot can be ensured thereby. This contributes to the circumstance that the pipette tips of each subfamily can only be used with a pipette matched thereto. According to a preferred embodiment, the positions occupied by the top ends of the plunger rods in the respectively deepest position of the tip plunger relate to the bead or annular groove of the pipette tips. According to this embodiment, the positions that the top ends of the plunger rods have in the respectively deepest position of the tip plunger relative to the seating region are the positions that the top ends of the plunger rods have in the respectively deepest position of the tip plunger relative to the bead or annular groove of the pipette tips. In other words, in this context the seating region is defined by the bead or the annular groove.

According to another embodiment, the pipette tip family comprises pipette tips of at least one tip type of a first subfamily having, in the respectively deepest position of the tip plunger, a top end of the plunger rod disposed in a first position above a circumferential bead on the inner circumference of the tip cylinder for use with pipettes matched thereto of a first pipette type, pipette tips of at least one additional tip type of a second subfamily having, in the respectively deepest position of the tip plunger, a top end of the plunger rod disposed in a second position below a bead arranged on the inner circumference of the tip cylinder for use with pipettes matched thereto of a second pipette tip, and pipette tips of at least one additional tip type of a third subfamily having, in the respectively deepest position of the tip plunger, a top end of the plunger rod arranged in a third position between the first and second positions for use with a pipette matched thereto of a third pipette type. In this embodiment, errors due to incorrect use of pipette tips are prevented especially reliably. According to another embodiment, the top end of the plunger rod of the pipette tips of the third subfamily is disposed at approximately the same height as the bead in the respectively deepest position of the tip plunger.

According to another embodiment, the pipette tip family comprises pipette tips with nominal volumes of 10 μl and 100 μl of a first subfamily for use with pipettes of a first pipette type, pipette tips with nominal volumes from 25 μl and 250 μl of a second subfamily for use with pipettes of a second pipette type, and a pipette tip with a nominal volume of 1000 μl of a third subfamily for use with pipettes of a third pipette type.

According to another embodiment, the plunger rods of the pipette tips of the pipette tip family are, and/or the stroke rod of the pipettes of the pipette family is, elastically formed at least at the bottom end, so that the plunger rod can be pressed into the axial bore of the stroke rod under elastic deformation of the plunger rod and/or of the bottom end of the stroke rod. According to another embodiment, the pipettes of the pipette family have stroke rods that have at least one slot in the bottom end running in the longitudinal direction. The elastic expandability of the stroke rods is improved by the at least one slot. According to another embodiment, the stroke rods respectively have a plurality of slots, for example three slots. According to another embodiment, the segments of the stroke rod remaining between the slots are formed on the bottom as inwardly projecting hooks. The plunger rods are securely clamped especially reliably by means of the hooks.

According to another embodiment, the pipette tip family comprises pipette tips wherein the plunger rod has a clamping groove for securely clamping a clamping element or a plurality of clamping elements of the stroke rod.

According to another embodiment, the clamping elements are the hooks formed on the segments of the stroke rod between the slots. According to another embodiment, the hooks are formed so that they engage in the clamping groove in a form-fitting manner. According to another embodiment, the clamping element is a clamping spring.

According to another embodiment, the pipette tip family comprises pipette tips wherein the plunger rods have a lower rod section with a larger outer diameter for securely clamping a clamping element of the stroke rod, and above this, in an upper rod section, a smaller diameter than the lower rod section so that the upper rod section cannot be securely clamped by the clamping element of the stroke rod. According to another embodiment, the pipette tip family comprises pipette tips wherein the plunger rods, in a lower rod section having a larger outer diameter, have a clamping groove securely clamping at least one clamping element of the stroke rod, and above this in an upper rod section, a smaller diameter than the lower rod section. This ensures that the pipette tip can only be connected to the type of pipette for which it is intended.

According to another embodiment, the pipette tip family comprises pipette tips wherein the plunger rods have a hard stop at a distance from their top ends for supporting on the edge of a hole on the bottom end of the stroke rod. The hard stop prevents the plunger rod from being pressed deeper into the stroke rod, which would have the effect that the fluid taken up by the pipette tip cannot be fully dispensed, for example when pipetting highly viscous fluids.

According to another embodiment, the pipette tip family comprises pipette tips wherein the tip plunger has the hard stop for supporting on the edge of a hole at the bottom end of the stroke rod below a lower rod section for securely clamping at least one clamping element of the stroke rod and/or below a clamping groove for securely clamping at least one clamping element of the stroke rod. The hard stop prevents the plunger rod from being pressed so deeply into the seat of the stroke rod that the fluid drawn by the pipette tip cannot be fully dispensed. Without the hard stop, this would occur, for example when pipetting highly viscous fluids. When dispensing the highly viscous fluid from the pipette tip, a strong force acts on the plunger due to the high flow resistance of the fluid, whereby the plunger could be pushed deeper into the seat. This is prevented by disposing the hard stop on the edge of the hole on the bottom end of the stroke rod. Pipetting errors are avoided in this manner.

According to another embodiment, the pipette tip family comprises pipette tips made of one or more plastics. According to another embodiment, the pipette tips consist of polypropylene and/or polyethylene. According to another embodiment, the pipette tips consist of polypropylene and the tip plungers consist of polyethylene.

According to another embodiment of the pipette family according to the invention, the control apparatus of the pipette is a mechanical control apparatus, at least for one pipette type. According to another embodiment, the pipettes of all pipette types have a mechanical control apparatus.

According to another embodiment, the control apparatus of each pipette of the pipette family is designed (i.) upon sensing a plunger rod that has the length of the plunger rod of a pipette tip of a subfamily matched to the pipette, to place the drive apparatus into a state enabling pipetting and to permit the secure clamping of the pipette tip to the spigot and stroke rod, and/or (ii.) upon sensing a plunger rod that is shorter than the plunger rod of a pipette tip of a subfamily matched to the pipette, to place the drive apparatus into a state not enabling pipetting, and/or (iii.) upon sensing a plunger rod that is longer than the plunger rod of a pipette tip of a subfamily matched to the pipette, to prevent the secure clamping of the pipette tip to the spigot and/or stroke rod. In this manner, it is achieved that the pipette of each pipette type can only be used with pipette tips of a subfamily matched thereto.

According to another embodiment, the control apparatus of each pipette of the pipette family has the following features: (1) an ejection apparatus comprising a curved support rotatably mounted within the pipette housing; (2) a second sensing element on the elongated first sensing element, which is displaceably guided in the pipette housing in the longitudinal direction of the spigot, said second sensing element being guided on a first curve on the circumference of the curved support; and (3) an operating element connected to the curved support, projecting from the pipette housing and rotatable relative to the pipette housing. The ejection apparatus is configured, by rotation of the operating element from a pipetting position to an ejection position, to rotate the curved support, wherein the first curve displaces the second sensing element downward so that the elongated first sensing element pushes off of the spigot a pipette tip held on the spigot. The ejection apparatus is configured, upon sensing a plunger rod by means of the elongated first sensing element, said plunger rod being shorter than the plunger rod of a pipette tip of a subfamily matched to the pipette, not to rotate the operating element from the ejection position to the pipetting position, so that pipetting is prevented.

In this embodiment, the control apparatus is simultaneously an ejection apparatus that can be used to detach used pipette tips from the pipette. A pipette tip can be pushed off of the spigot by rotation of the operating element from the pipetting position to the ejection position. When mounting a pipette tip on the spigot, the operating element rotates from the ejection position to the pipetting position when the first sensing element senses the plunger rod of a subfamily matched to the pipette. If the plunger rod is shorter, the operating element does not rotate to the pipetting position, so that the ejection apparatus prevents pipetting. In this embodiment, even if the plunger rod is so short that it is not sensed by the elongated first sensing element, the operating element does not rotate from the ejection position to the pipetting position so that pipetting is prevented.

According to another embodiment, the control apparatus of each pipette of the pipette family has the following features: (1) the spigot has means for the form-fit connection to a pipette tip so that a pipette tip can be shoved onto the spigot while elastically constricting the spigot and/or while elastically expanding the tip cylinder and/or the bottom end of the plunger rod and/or the top end of the plunger rod before its form-fitting connection to the spigot, and/or the stroke rod can be shoved onto the spigot and/or shoved into the stroke rod; and (2) a locking apparatus. The lock apparatus comprises a locking sleeve arranged concentric to the spigot and/or the stroke rod, a control rod projecting upward from the locking sleeve that is displaceably guided in the direction of the spigot in the pipette housing, a third sensing element projecting from the control rod, and a second curve on the periphery of the curved support on which the third sensing element is guided and that is designed so that upon arrangement of the operating element in the pipetting position, the locking sleeve in a locked position limits the spigot on the inside and/or limits the tip cylinder on the outside and/or limits the stroke rod on the outside and/or limits the plunger rod on the outside, so that the locking sleeve prevents a pipette tip form-fittingly connected to the spigot and/or the stroke rod from detaching from the spigot and/or the stroke rod. By rotating the operating element from the pipetting position to the ejection position, the locking sleeve can be displaced upward so that the spigot and/or the pipette tip is exposed, at least in part, and the elongated first sensing element pushes the pipette tip off of the spigot, and upon sensing a plunger rod by means of the elongated first sensing element, said plunger rod being longer than the plunger rod of a pipette tip of a subfamily matched to the pipette, the locking sleeve can be displaced to the locked position so that secure clamping of the pipette tip to the pipette is prevented.

In this embodiment, the control apparatus is simultaneously an apparatus for the form-fitting connection of a pipette tip to the pipette so that the pipette tip can be held especially securely to the pipette. When mounting on the spigot a pipette tip for which the plunger rod has the length of a pipette tip matched to the pipette, the locking sleeve is rotated to the locked position by the first sensing element and the pipette is secured to the spigot in this way. If the plunger rod is longer than the plunger rod of a pipette tip of a subfamily matched to the pipette, the locking sleeve is displaced toward the locked position before the pipette tip is sufficiently pushed onto the spigot, i.e., when the spigot is elastically constricted and/or the pipette tip is elastically expanded to such an extent that the locking sleeve cannot be displaced to the locked position. This prevents the pipette tip from being further pushed onto the spigot so that the pipette tip cannot be connected to the pipette in such a manner that pipetting is possible. Moreover, the operating element is not brought from the ejection position to the pipetting position, by which pipetting is also prevented.

Pipette tips and pipettes that can be form-fittingly connected to one another, and locking apparatuses for preventing pipette tips form-fittingly connected to the pipette from being detached are described in the German Patent Application DE 10 2020 118 587.1.

According to another embodiment, the control apparatus of each pipette comprises a hard stop that limits the pushing on of pipette tips onto the spigot so that when pushing a pipette tip with a collar onto the spigot, said collar being longer than the collars of the pipette tips of a subfamily matched to the pipette, the hard stop prevents secure clamping of the pipette tip to the pipette. In this embodiment, the control apparatus simultaneously ensures that pipette tips that are matched to the pipette have a defined seating on the spigot. In this way, the force for clamping the pipette tips onto the spigot and for detaching the pipette tips from the spigot can also be limited. In particular the hard stop can be formed by a surface on the bottom of the pipette housing, by a shoulder of the spigot, or by a surface on the bottom of a fourth sensing element that can be displaced against another hard stop of the pipette.

According to another embodiment, the spigot has a certain shape. According to another embodiment, the spigot is a conical, cylindrical, or sectionally conical and cylindrical projection. According to another embodiment, the spigot has a plurality of conical sections with different cone angles. In addition, the spigot can have at least one cylindrical section.

BRIEF DESCRIPTION OF THE DRAWINGS

The invention is explained below based on the accompanying drawings of an exemplary embodiment. In the drawings.

DETAILED DESCRIPTION OF THE INVENTION

In the present application, the expressions “upper” and “lower” as well as “vertical” and “horizontal” and terms derived therefrom such as “above” and “below”, “standing upright” and “upside down” as well as “over each other” refer to an arrangement of the pipette wherein the spigot is oriented vertically, and is located on the downwardly facing end of the pipette housing. With regard to the pipette tip, these expressions refer to a vertical orientation of the middle axis of the pipette tip, wherein the tip opening is arranged at the bottom, and the mounting opening is arranged at the top.

Figure 1:
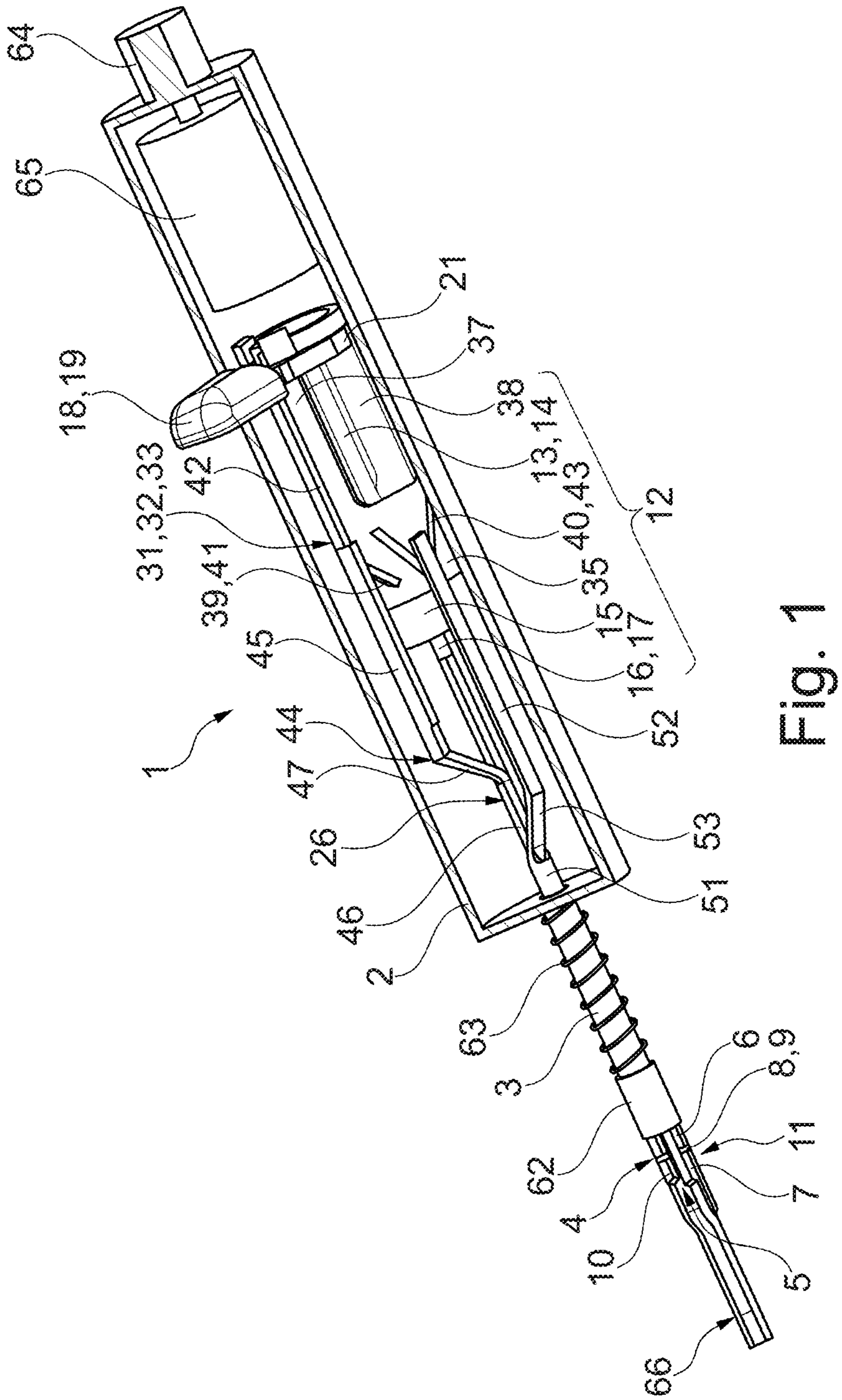
FIG. 1 illustrates a perspective view of a partially cut-away embodiment of a positive displacement pipette with a pipette tip mounted on a spigot.
Figure 2:
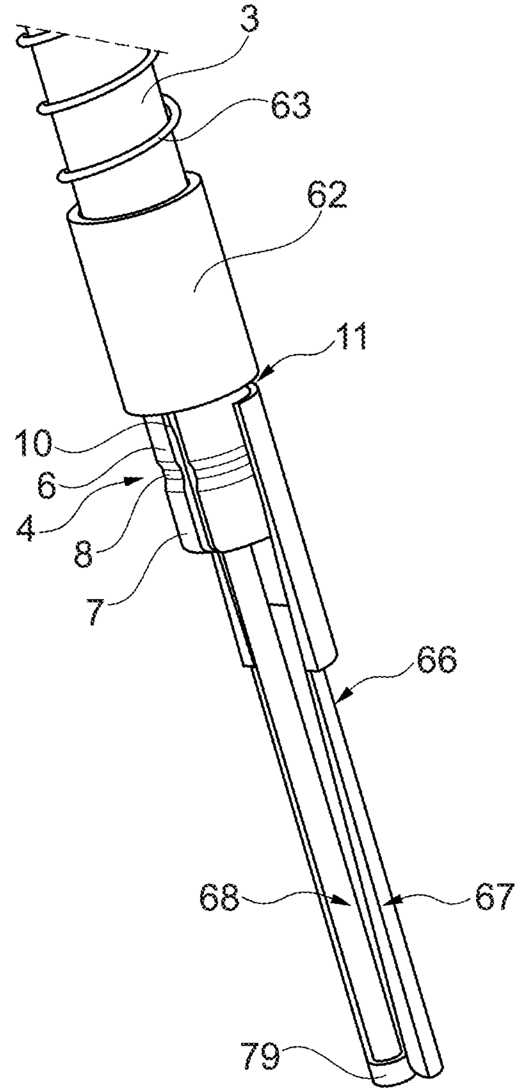
FIG. 2 illustrates an enlarged perspective view of an embodiment of a positive displacement pipette with an embodiment of a slotted spigot including an inner adjacent locking sleeve.
Figure 3:
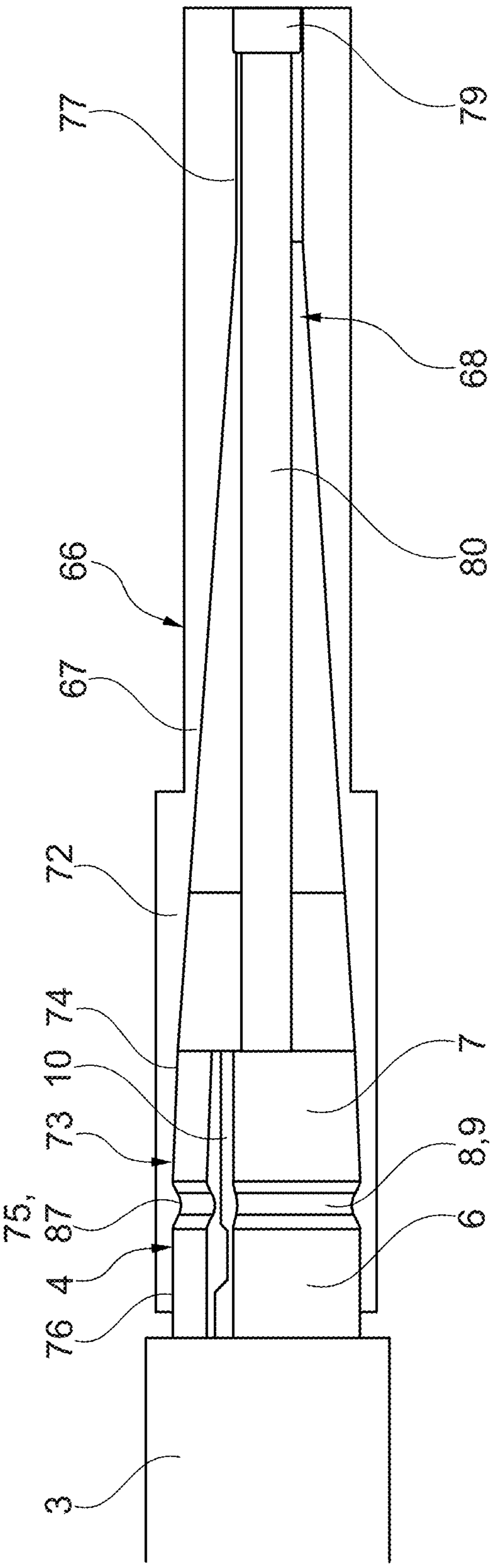
FIG. 3 illustrates a side elevational view of the embodiment of FIG. 2.

According to FIG. 1, a pipette 1 configured as a positive displacement pipette has a rod-shaped (e.g. cylindrical) pipette housing 2. A hollow cylindrical shaft 3 projects downward from the bottom end of the pipette housing 2. A spigot 4 projects from the bottom end of the shaft 3, said spigot having a through-bore 5 with a through-hole at the bottom end according to FIGS. 1 and 4. The inner diameter of the through-bore 5 is smaller than the inner diameter of the shaft 3. The spigot 4 has an upper spigot section 6 in the shape of a hollow cone and under this, a lower spigot section 7 in the shape of a hollow cone.

The upper spigot section 6 has a smaller cone angle than the lower spigot section 7. An annular groove 8 runs around the outer circumference of the spigot 4 between the upper spigot section 6 and the lower spigot section 7. The upper spigot section 6, the annular groove 8 and the lower spigot section 7 form a first means for the form-fit connection of the pipette to a pipette tip. The annular groove 8 forms a clamping region 9 for a corresponding bead of a pipette tip. Furthermore, the spigot 4 has slots 10, 11, preferably three, running in its longitudinal direction that are distributed at equal distances on the circumference of the spigot 4. The slots 10, 11 extend from the bottom end over the entire length of the spigot 4.

Figure 5:
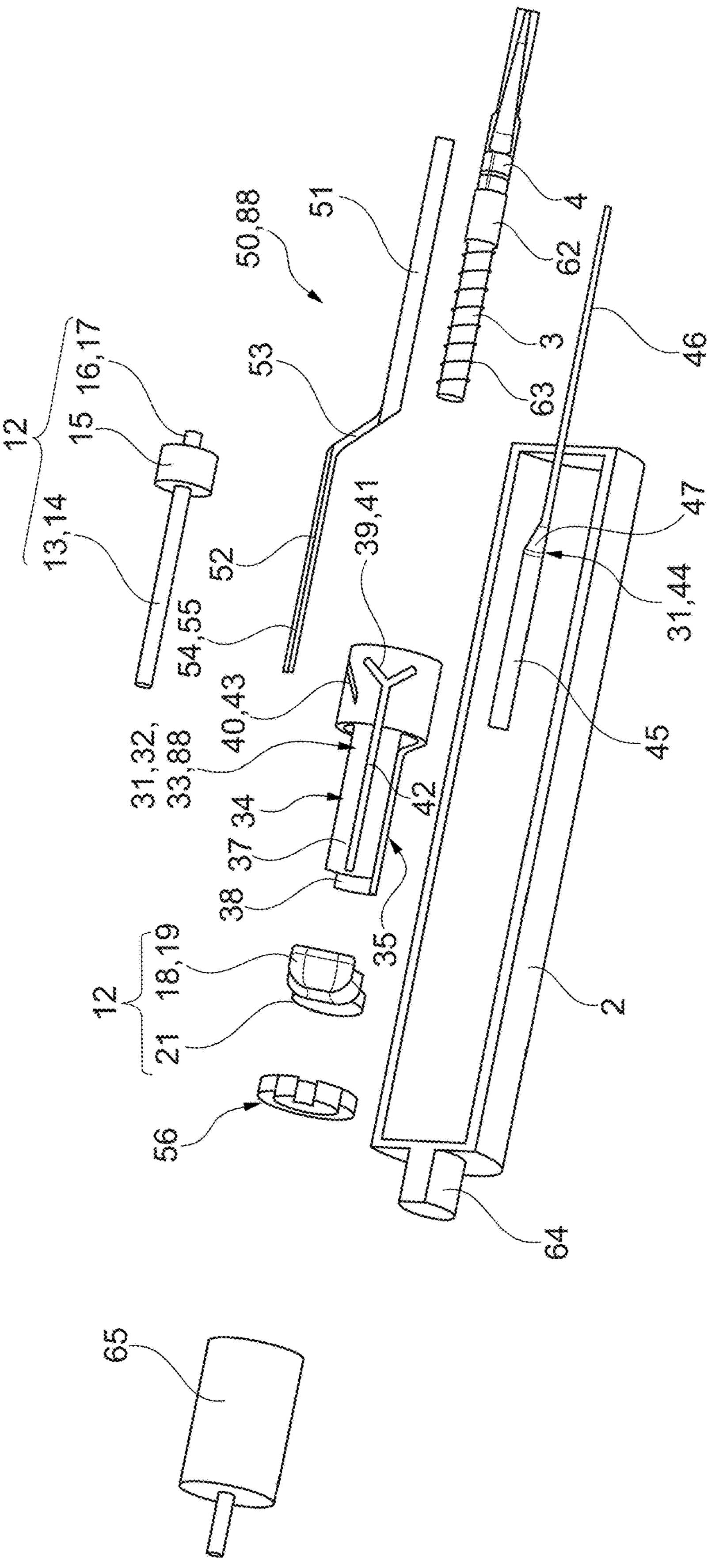
FIG. 5 illustrates an exploded view of the embodiment of FIG. 1.
Figure 6:
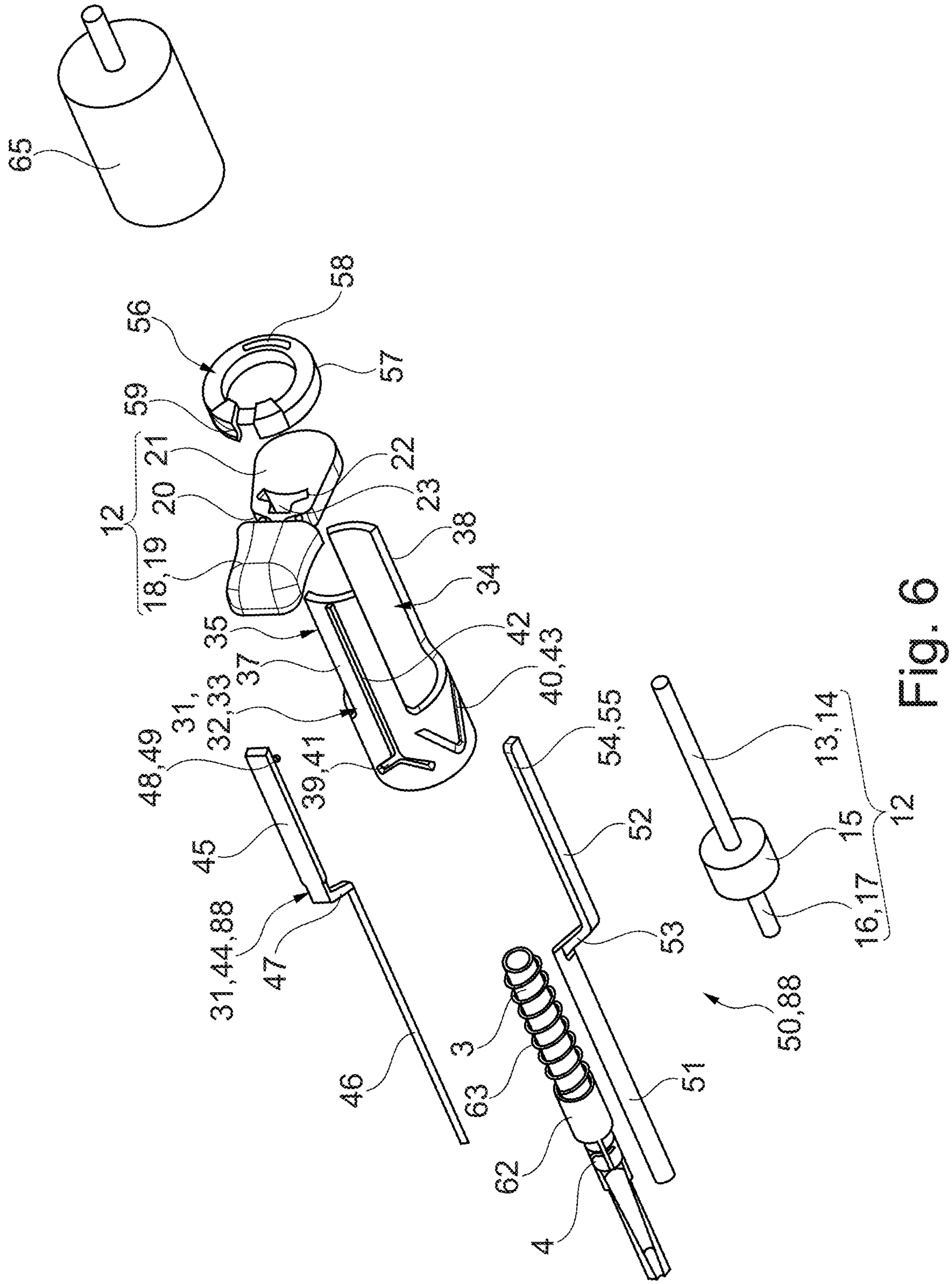
FIG. 6 illustrates an exploded view of the embodiment of FIG. 1 without the pipette housing.

According to FIGS. 1, 5 and 6, there is a drive apparatus 12 in the pipette housing 2 that comprises a transmission element 13 in the form of a transmission rod 14, a transmission mechanism 15 and a drive element 16 in the form of a stroke rod 17. Furthermore, the drive apparatus 12 comprises an operating element 18 in the form of an operating lever 19 that is securely connected via a bar 20 to a support plate 21.

According to FIG. 6, the support plate 21 has an oval shape with a wide rounded end and a narrow rounded end, wherein the operating lever 19 projects from the edge of the narrow rounded end. In addition to this edge, the support plate 21 has a first curved slot 22 that runs approximately parallel to the contour of the narrow rounded end. Furthermore, the support plate 21 has a rectangular, first edge cutout 23 in the middle of the first curved slot 22 on the side of the narrow rounded end.

According to FIGS. 1 and 5, the stroke rod 17 is inserted from above into the shaft 3 and the spigot 4. According to FIG. 4, it is hollow and provided with an axial bore 24 that extends to a hole 25 in the bottom end of the stroke rod 17. Furthermore, it has a longitudinal slot 26 starting from its top end running in the longitudinal direction and ending before its bottom end. Because of the longitudinal slot 26, the stroke rod 17 has a C-shaped cross-section. Its bottom end forms a seat 27 for the top end of a plunger rod.

According to FIG. 13*a*, the stroke rod 17 has a circumferential clamping spring groove 28 in the unslotted region next to its bottom end. There are clamping slots 29.1, 29.2 within the clamping spring groove 28 on two diametrically opposite sides in the stroke rod 17 wherein the clamping spring groove 28 is open toward the inner side of the stroke rod 17. A clamping spring 30 is inserted into the clamping spring groove 28 and engages in the inner cross-section of the stroke rod 17 by means of the clamping slots 29.1, 29.2.

Turning back to FIGS. 1, 5 and 6, the transmission mechanism 15 is configured so that the stroke rod 17 is alternatingly displaced downward and upward during sequential downward displacements of the operating lever 19 between which the operating lever 19 is displaced upward. Consequently, by pressing the operating lever 19 downward, the stroke rod 17 can be displaced from a bottom position into a top position, the stroke rod 17 retains the top position during the subsequent upward displacement of the operating lever 19, and the stroke rod 17 is again displaced downward by subsequently pressing the operating lever 19 downward. This can be repeated as frequently as desired.

According to FIGS. 1, 5 and 6, the pipette 1 is provided with an ejection apparatus 31. This comprises a curved support 32 that is rotatably mounted in the pipette housing 2 and is configured as a hollow cylindrical rotating sleeve 33. The rotating sleeve 33 is for example rotatably mounted by its outer circumference on the inner circumference of the pipette housing 2, and the upper and bottom ends are supported against ledges of steps on the inner circumference of the pipette housing 2 so that it cannot be displaced in an axial direction in the pipette housing 2. The rotational axis of the rotating sleeve 33 coincides with the longitudinal axis of the pipette housing 2 and the longitudinal axis of the spigot 4.

The rotating sleeve 33 has parallel cutouts 34, 35 on two diametrically opposite sides to its rotational axis which extend from the upper edge of the rotating sleeve 33 and terminate at a distance from its lower edge. Below the cutouts, the rotating sleeve 33 accordingly consists of an annular base 36, and it also consists of two diametrically opposite sectors 37, 38 of an annulus that border the two cutouts 34, 35 on the side.

A first curve 39 and a second curve 40 are arranged on the outer circumference of the annular base 36 of the rotating sleeve 33. The first curve 39 is configured as a first groove 41 in the form of an inverted (upside down) Y. The vertical part 42 of the Y extends far upward to a sector 37 just short of the upper edge of the sector 37. The second curve 40 is a second groove 43 in the outer circumference of the base 36 of the rotating sleeve 33 in the form of an upright V. The first curve 39 and the second curve 40 are arranged offset 90 degrees relative to each other on the circumference of the rotating sleeve. The first curve 39 and the second curve 40 each extend over an angular range of less than 90 degrees over the circumference of the rotating sleeve 33.

According to FIGS. 1, 5 and 6, the ejection apparatus 31 comprises a first elongated sensing element 44 (ejection rod) that comprises a strip-shaped upper ejection rod part 45 and a cylindrical lower ejection rod part 46. The upper and the lower ejection rod part 45, 46 are parallel to each other and arranged laterally offset to each other. The bottom end of the upper ejection rod part 45 is connected to the top end of the lower ejection rod part 46 by a strip-shaped connecting rod part 47 angled obliquely relative to the two ejection rod parts. A second sensing element 48 in the form of a first guide pin 49 extends perpendicular from the inside of the upper ejection rod part 45. The first sensing element 44 is preferably configured as a single part, for example from a rigid plastic or metal.

Figure 4:
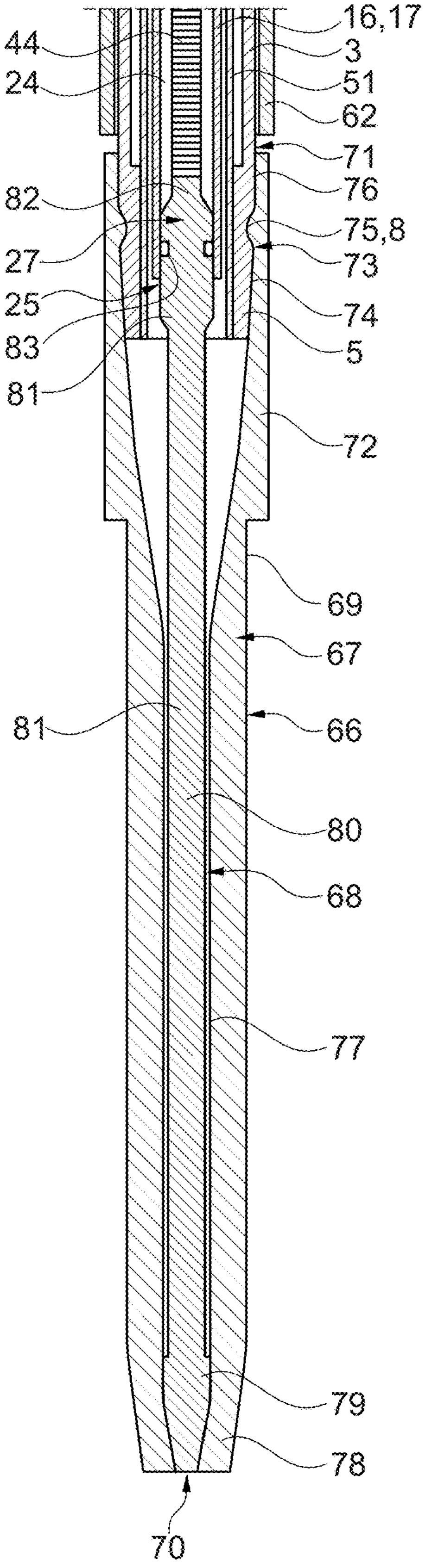
FIG. 4 illustrates a longitudinal sectional view of the embodiment of FIG. 2.
Figure 7:
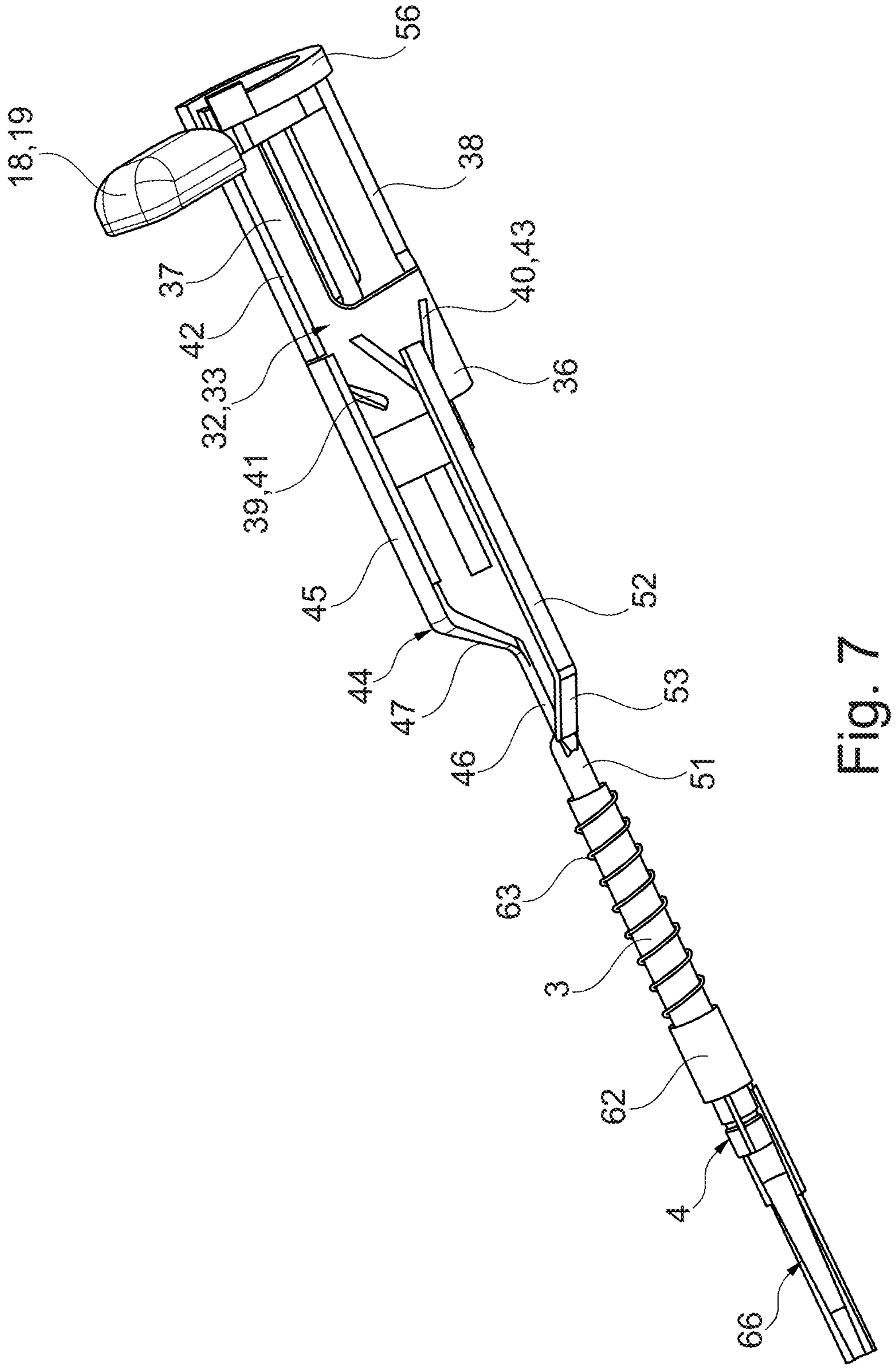
FIG. 7 illustrates a perspective view of an embodiment of a rotating sleeve of a positive displacement pipette with the ejection rod and the locking sleeve in the starting position.

According to FIGS. 1, 4 and 7, the first sensing element 44 is guided with the guide pin 49 in the first groove 41, the connecting rod part 47 penetrates the longitudinal slot 26 of the stroke rod 17, and the lower ejection rod part 46 extends within the stroke rod 17 just short of the bottom end thereof.

According to FIGS. 1, 4, 5 and 6, the pipette 1 comprises a locking apparatus 50 that comprises a locking sleeve 51 and a strip-shaped control rod 52 parallel thereto. The top end of the locking sleeve 51 and the bottom end of the control rod 52 are connected to each other by a second connecting rod part 53 that is angled obliquely to the locking sleeve 51 and to the control rod 52. A third sensing element 54 in the form of a second guide pin 55 projects from the inside of the control rod 52.

According to FIGS. 1 and 7, the second guide pin 55 is guided in the second groove 43. According to FIGS. 1 and 4, the locking sleeve 51 is inserted from above into the shaft 3 and abuts the inner side of the spigot 4. The stroke rod 17 and the elongated first sensing element 44 are inserted from above into the locking sleeve 51.

The operating element 18 with the first curved slot 22 is pushed onto the sector 37 of the rotating sleeve 33 in which sector the first groove 41 extends. According to FIGS. 1, 6 and 7, the rotating sleeve 33 is connected at its top to a support ring 56 that bridges the two sectors 37, 38 and stabilizes the rotating sleeve 33. The support ring 56 has a jacket 57 projecting downward on its outer edge enclosing the two sectors 37, 38 along the outer side edges. Furthermore, it has a second curved slot 58 that occupies the upper edge of the sector 38, said upper edge not being provided with a groove 41, 43. On the diametrically opposite side on the jacket 57, there is a rectilinear second edge cutout 59 open on the bottom configured to receive the bar 20 between the operating lever 19 and support plate 21. The support ring 56 is for example connected to the rotating sleeve 33 by adhesion and/or in a form-fitting manner.

The rotating sleeve 33 and the locking sleeve 51 as well as the operating element 18 are for example made of one or more rigid plastics and/or of metal. The rotating sleeve 33, the support ring 56, the operating element 18 and/or the locking sleeve 51 are preferably each configured as a single part. An operating button of the operating element 18 can also be produced from an elastic or soft-elastic plastic or rubber.

Figure 11:
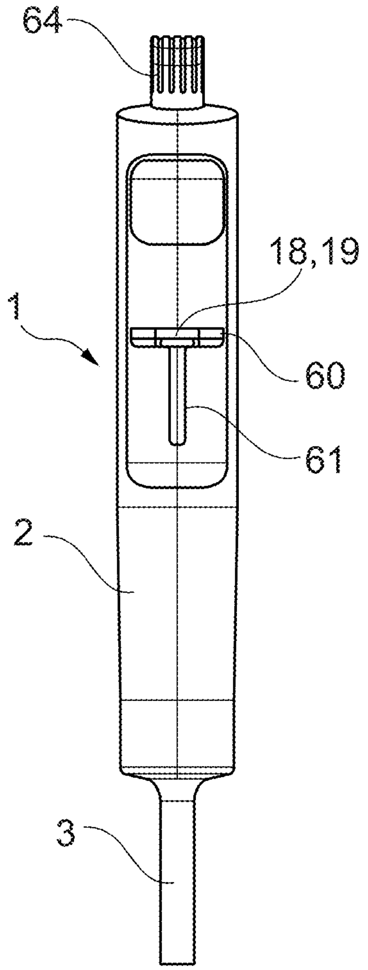
FIG. 11 illustrates a front view of the embodiment of FIG. 7.
Figure 12A:
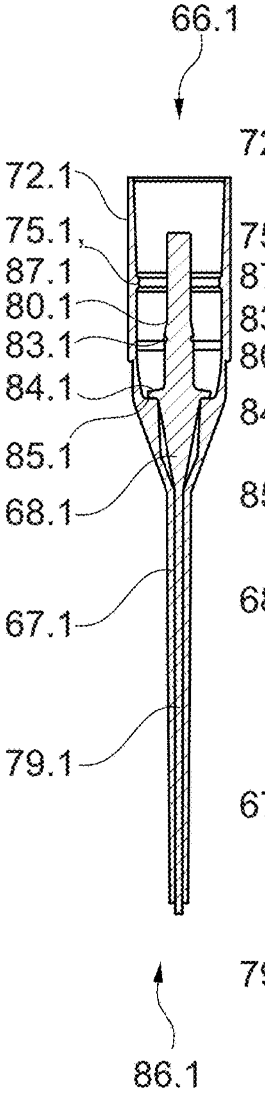
FIG. 12*a* illustrates a longitudinal section of an embodiment of a pipette tip with a nominal volume of 10 µl.
Figure 12B:
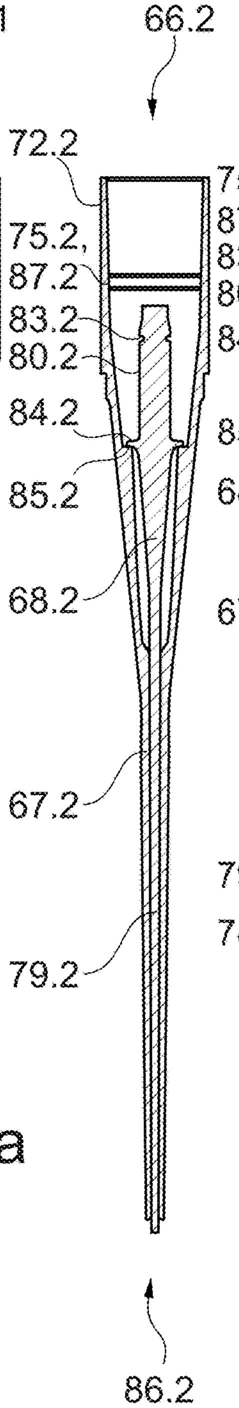
FIG. 12*b* illustrates a longitudinal section of an embodiment of a pipette tip with a nominal volume of 25 µl.
Figure 12C:
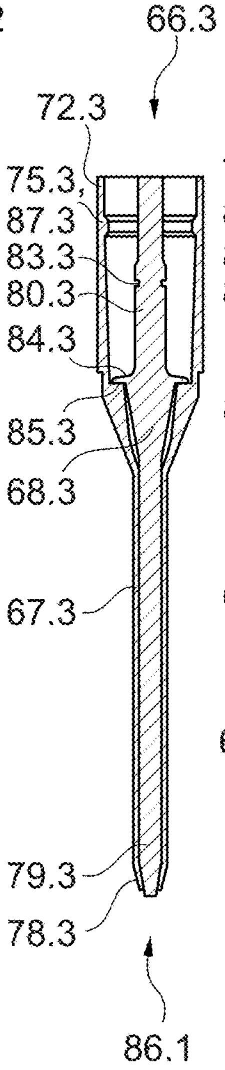
FIG. 12*c* illustrates a longitudinal section of an embodiment of a pipette tip with a nominal volume of 100 µl.
Figure 12D:
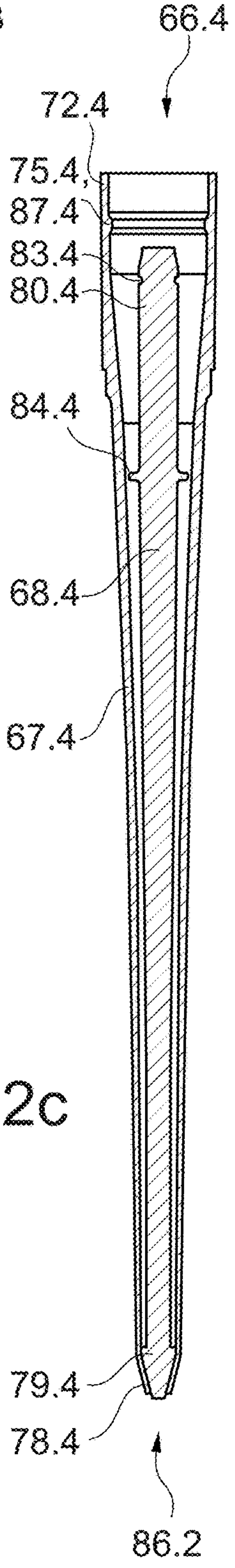
FIG. 12*d* illustrates a longitudinal section of an embodiment of a pipette tip with a nominal volume of 250 µl.
Figure 12E:
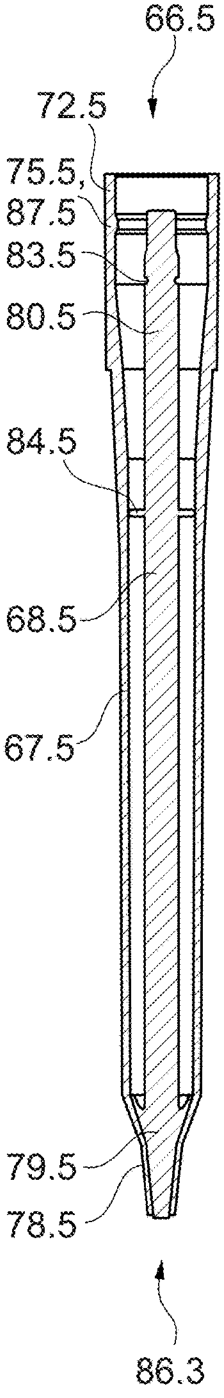
FIG. 12*e* illustrates a longitudinal section of an embodiment of a pipette tip with a nominal volume of 1000 µl.

According to FIG. 11, so that it can be operated from the outside, the operating lever 19 extends out of the pipette housing 2 through a first housing slot 60 running transverse to the longitudinal axis of the pipette housing 2 and extending over a part of the circumference of the pipette housing 2. The first housing slot 60 is connected in the middle to a second housing slot 61 running in the longitudinal direction of the pipette housing 2.

Opposite the effect of a spring apparatus, the operating lever 19 can be displaced downward, starting from the support ring 56, along the second housing slot 612, wherein it slides with the first curved slot 22 on the sector 37 of the rotating sleeve 33. After being relieved, the spring apparatus independently displaces the operating lever 19 back upward.

A sleeve-shaped fourth sensing element 62 is guided on the outside of the shaft 3. A spring apparatus in the form of a helical spring 63 guided on the shaft abuts the bottom of the pipette housing 2 and the top of the fourth sensing element 62. By means of the helical spring 63, the fourth sensing element 62 is pressed from above against a hard stop element on the shaft 3 or the spigot 4.

An adjusting knob 64 for adjusting a dosing volume is arranged on the top of the pipette housing 2. The dosing volume can be adjusted by turning the adjusting knob 64. A counter 65 arranged thereunder in the pipette housing 2 indicates the adjusted dosing volume in each case. The adjusting knob 64 and/or the counter 65 is coupled to the transmission mechanism 15. The transmission mechanism 15 is configured to change the stroke of the stroke rod 17 corresponding to the particular adjusted dosing volume, which stroke is executed by the downward displacement of the operating element 18.

According to FIGS. 1 to 4, a pipette tip 66 comprising a tip cylinder 67 and a tip plunger 68 is mounted on the spigot 4. The tip cylinder 67 comprises a tubular body 69 that has a tip opening 70 in the bottom end, a collar 72 having a mounting opening 71 on the top end, and a connection region 73 on the inner circumference of the collar 72 for clamping onto the spigot 4. The connection region 73 has a contour complementary to the spigot 4, said contour having a conical, lower connection section 74 at the bottom for accommodating the conical lower spigot section 7, above which is a peripheral bead 75 for engaging in the annular groove 8 of the spigot 4, and above which is a conical upper connection section 76 for accommodating the cylindrical upper spigot section 6. The lower connection section 74, the bead 75, and the upper connection section 76 form second means for the form-fit connection of the pipette tip 66 with the pipette 1.

Below the connection region 73, the tubular body 69 has a cylindrical plunger travel path 77. Thereunder, the tubular body 69 has a downwardly tapering tip section 78 with the shape of a conical frustum. The tip section 78 is shown in FIG. 4 and is omitted in the other drawings for reasons of simplification.

A tip plunger 68 is inserted into the tubular body 69. This comprises a plunger 79 that is guided in the plunger travel path 77. A plunger rod 80 projects upward from the plunger 79 and has a smaller diameter than the plunger 79. The plunger rod 80 has a lower rod section 81 with a larger diameter and above this, an upper rod section 82 with a diameter that is smaller relative to the lower rod section 81. On the lower rod section 81, the plunger rod 80 has a circumferential clamping groove 83 on the outside.

According to FIG. 12, a pipette tip family comprises five different pipette tip types. These are pipette tip types 66.1 to 66.5 with three different nominal volumes of 10 µl (FIG. 12*a*), 25 µl (FIG. 12*b*), 100 µl (FIG. 12*c*), 250 µl (FIGS. 12*d*) and 1000 µl (FIG. 12*e*). In all pipette tips 66.1 to 66.5 from FIG. 12, the tip plunger 68.1 to 68.5 is in a position in which it is shoved as deep as possible into the tip cylinder 67.1 to 67.5.

Shoving the tip plunger 68.1 to 68.3 into the tip cylinder 67.1 to 67.3 is limited in the smaller pipette tips 66.1 to 66.3 having a nominal volume of 10, 25 and 100 µl by a disc 84.1 to 84.3 arranged on the tip plunger 68.1 to 68.3 between the plunger rod 80.1 to 80.3 and the plunger 79.1 to 79.3 sitting on a ledge 85.1 to 85.3 in the tip cylinder 67.1 to 67.3. The two larger pipette tips 66.4, 66.5 having a nominal volume of 250 µl and 1000 µl also have a disc 84.4, 84.5 that serves to center the tip plunger 68.4, 68.5 in the tip cylinder 67.4, 67.5. In the pipette tips 66.4 to 66.5, the deepest position of the tip plunger 68.4 to 68.5 is (additionally) defined by the placing of a conical plunger 79.4 to 79.5 on a conical tip section 78.4 to 78.5 on the bottom end of the tip cylinder 67.3 to 67.5.

The different nominal volumes are identified by the different height of the collar 72.1 to 72.5 of the tip cylinder 67.1 to 67.5. The height of the collar 72.1 to 72.5 is given as the distance from the bead 75.1 to 75.5 to the upper edge of the collar.

The pipette tips 66.1, 66.3 having a nominal volume of 10 µl and 100 µl form a first subfamily 86.1. In these, when the tip plunger 68.1, 68.3 is at its deepest position, the top ends of the plunger rods 80.1, 80.3 occupy the same positions above the seating region 87.1, 87.3 that are defined by the circumferential bead 75.1, 75.3.

The pipette tips 66.2, 66.4 having a nominal volume of 25 µl and 250 µl form a second subfamily 86.2. In these, when the tip plunger 68.2, 68.4 is at its deepest position, the top ends of the plunger rods 80.2, 80.4 have the same position below the seating region 87.2, 87.4 that are defined by the beads 75.2, 75.4.

The pipette tip 66.5 having a nominal volume of 1000 µl forms a third subfamily 86.3. This only consists of the single family member. In this subfamily 86.3, when the tip plunger 68.5 is at its deepest position, the top end of the plunger rod 80.5 is arranged at approximately the level of the upper edge of the seating region 87.5 that is defined by the bead 75.5.

Figure 13:
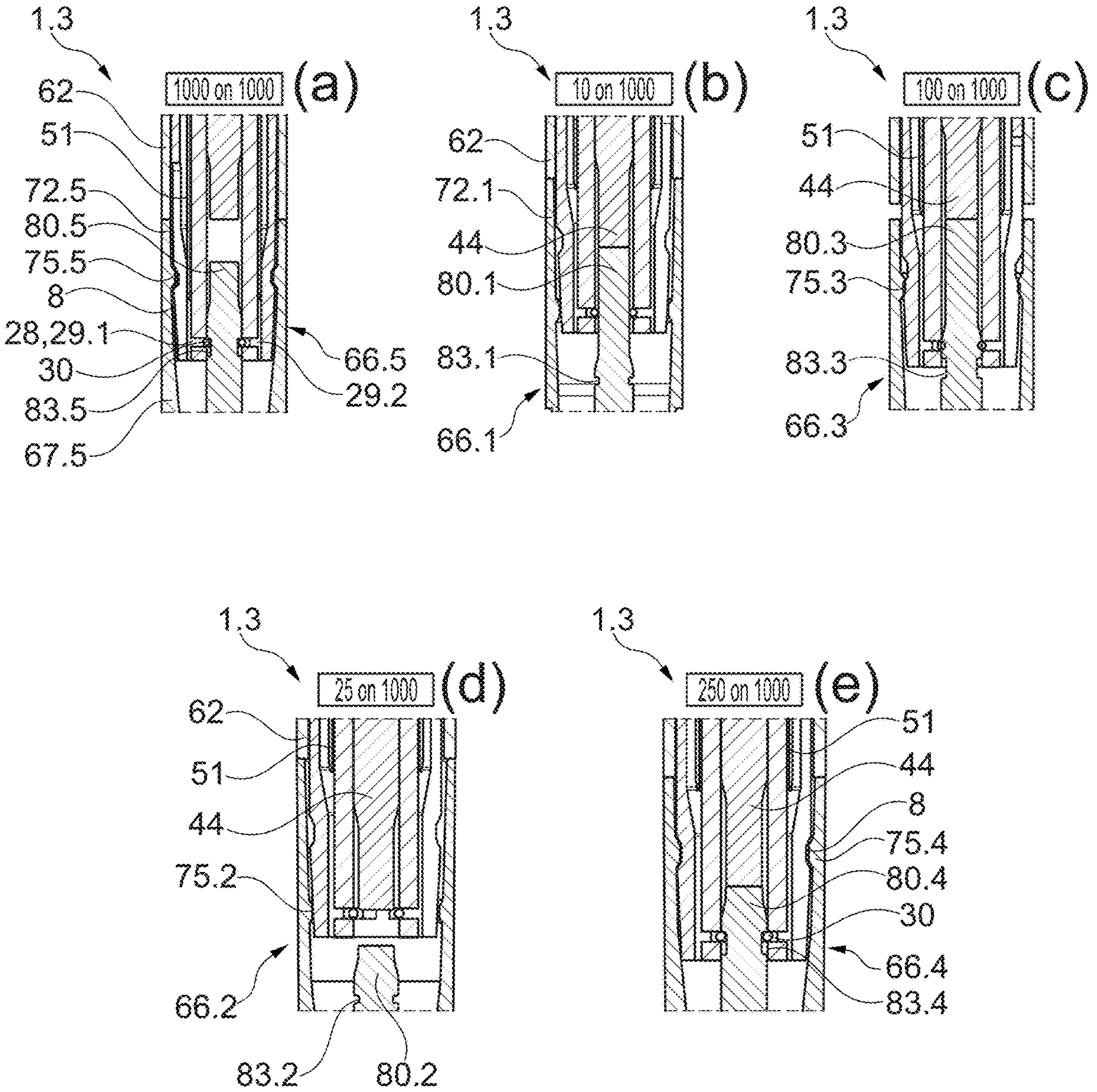
FIG. 13*a* illustrates a partial cut-away longitudinal section of an embodiment of a pipette configured for pipetting samples of up to 1000 µl with a mounted pipette tip having a nominal volume of 1000 µl.
FIG. 13*b* illustrates a partial cut-away longitudinal section of an embodiment of a pipette configured for pipetting samples of up to 1000 µl with a mounted pipette tip having a nominal volume of 10 µl.
FIG. 13*c* illustrates a partial cut-away longitudinal section of an embodiment of a pipette configured for pipetting samples of up to 1000 µl with a mounted pipette tip having a nominal volume of 100 µl.
FIG. 13*d* illustrates a partial cut-away longitudinal section of an embodiment of a pipette configured for pipetting samples of up to 1000 µl with a mounted pipette tip having a nominal volume of 25 µl.
FIG. 13*e* illustrates a partial cut-away longitudinal section of an embodiment of the pipette configured for pipetting samples of up to 1000 µl with a mounted pipette tip having a nominal volume of 250 µl.
Figure 14:
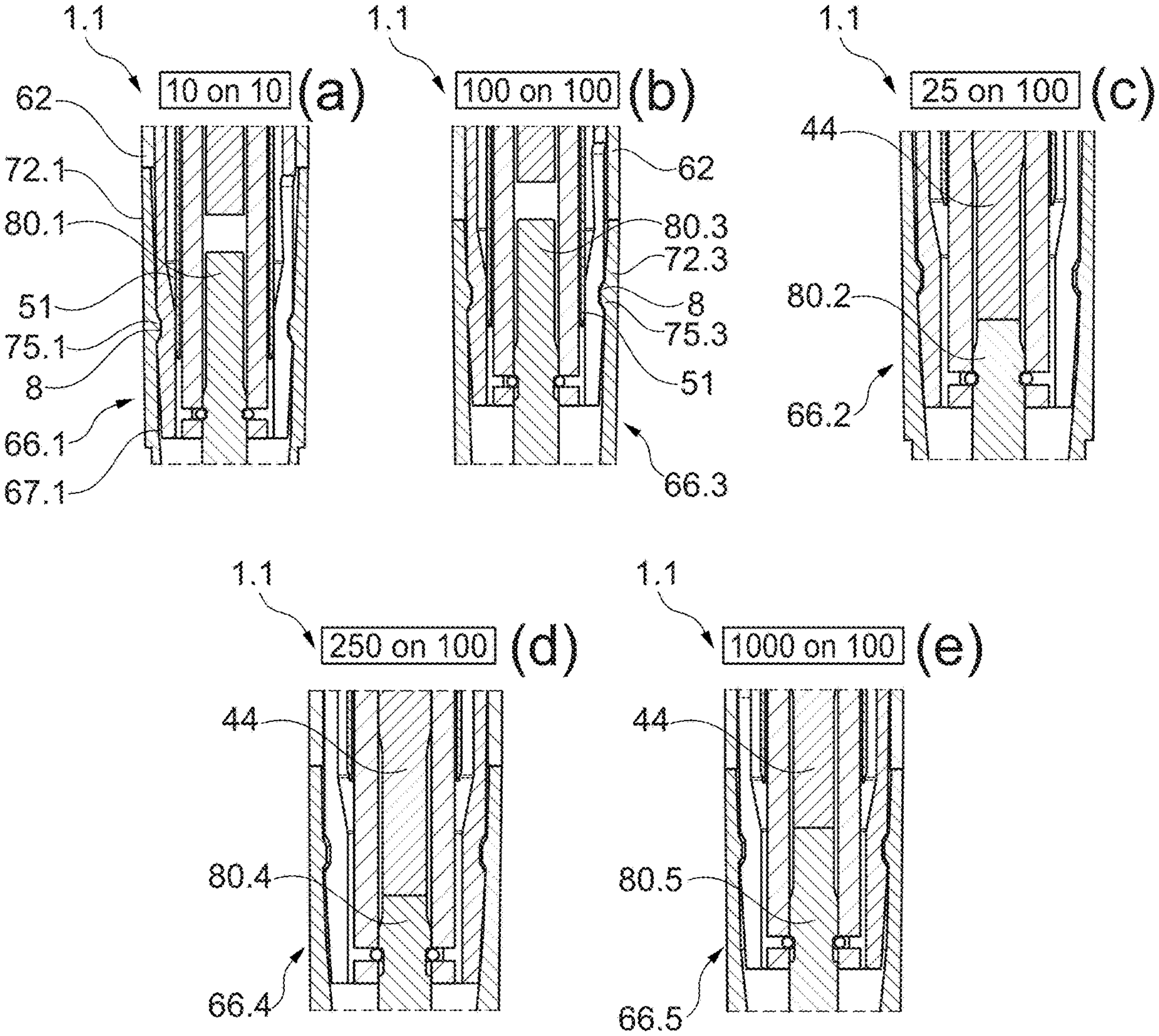
FIG. 14*a* illustrates a partial cut-away longitudinal section of an embodiment of the displacement pipette configured for pipetting samples of up to 100 µl with a mounted pipette tip having a nominal volume of 10 µl.
FIG. 14*b* illustrates a partial cut-away longitudinal section of an embodiment of the displacement pipette configured for pipetting samples of up to 100 µl with a mounted pipette tip having a nominal volume of 100 µl.
FIG. 14*c* illustrates a partial cut-away longitudinal section of an embodiment of the displacement pipette configured for pipetting samples of up to 100 µl with a mounted pipette tip having a nominal volume of 25 µl.
FIG. 14*d* illustrates a partial cut-away longitudinal section of an embodiment of the displacement pipette configured for pipetting samples of up to 100 µl with a mounted pipette tip having a nominal volume of 250 µl.
FIG. 14*e* illustrates a partial cut-away longitudinal section of an embodiment of the displacement pipette configured for pipetting samples of up to 100 µl with a mounted pipette tip having a nominal volume of 1000 µl.
Figure 15:
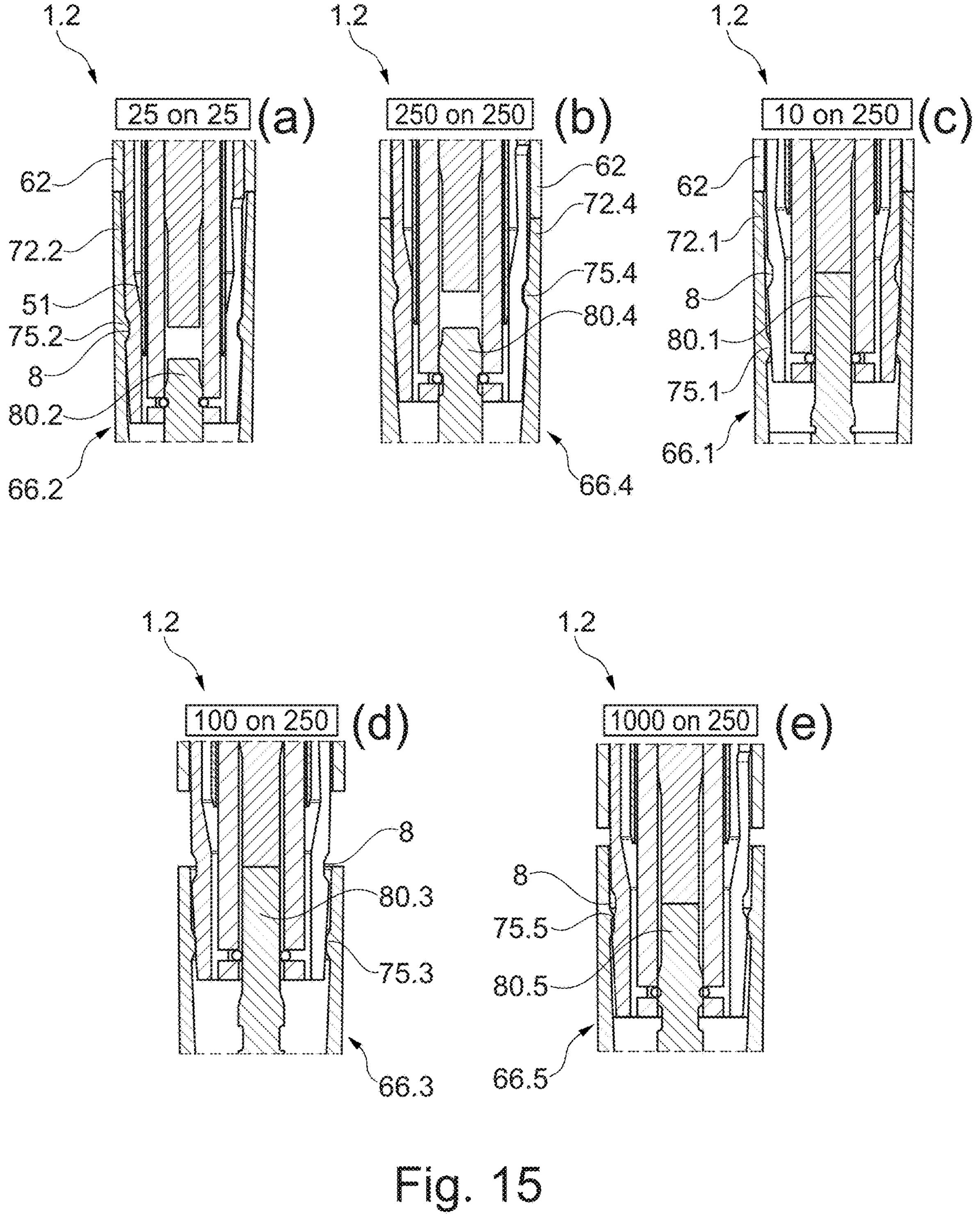
FIG. 15*a* illustrates a partial cut-away longitudinal section of an embodiment of the direct displacement pipette configured for pipetting samples of up to 250 µl with a mounted pipette tip having a nominal volume of 25 µl.
FIG. 15*b* illustrates a partial cut-away longitudinal section of an embodiment of the direct displacement pipette configured for pipetting samples of up to 250 µl with a mounted pipette tip having a nominal volume of 250 µl.
FIG. 15*c* illustrates a partial cut-away longitudinal section of an embodiment of the direct displacement pipette configured for pipetting samples of up to 250 µl with a mounted pipette tip having a nominal volume of 10 µl.
FIG. 15*d* illustrates a partial cut-away longitudinal section of an embodiment of the direct displacement pipette configured for pipetting samples of up to 250 µl with a mounted pipette tip having a nominal volume of 100 µl.
FIG. 15*e* illustrates a partial cut-away longitudinal section of an embodiment of the direct displacement pipette configured for pipetting samples of up to 250 µl with a mounted pipette tip having a nominal volume of 1000 µl.

According to FIGS. 13 to 15, the pipettes 1.1 to 1.3 are configured differently for pipetting with different pipette tips 66.1 to 66.5. According to FIG. 13, the pipette 1.3 is configured for pipetting with pipette tips 66.5 of the third subfamily 86.3 in the range from 100 µl to 1000 µl. According to FIG. 14, the pipette 1.1 is configured for pipetting with pipette tips 66.1, 66.3 of the first subfamily 86.1 in the range from 1 µl to 100 µl. According to FIG. 15, the pipette 1.2 is configured for pipetting with pipette tips 66.2, 66.4 of the second subfamily 86.2 in the range from 2.5 µl to 250 µl.

In FIGS. 13*a* to 15*e*, the tip plunger 68 is arranged at the deepest position in the tip cylinder 67 in each case. The position occupied by the top end of the plunger rod 80 in this situation is termed "starting position" in this application.

FIG. 13*a* shows the pipette 1.3 for pipetting volumes up to 1000 µl with a mounted pipette tip 66.5 having a nominal volume of 1000 µl. In the starting position, the top end of the plunger rod 80.5 is approximately at the same level as the upper edge of the bead 75.5 of the tip cylinder 67.5. Relative to the bead 75.5, the collar 72.5 of the pipette tip 66.5 projects upwards beyond a specific length for the pipette tip 66.5 having a nominal volume of 1000 µl.

According to FIG. 13*b*, the pipette tip 66.1 cannot be used with the pipette 1.3. This is because the upper edge of the collar 72.1 presses the fourth sensing element 62 against an upper hard stop so that the pipette tip 66.1 cannot be shoved farther onto the spigot 4. Consequently, the plunger rod 80.1 does not push the first sensing element 44 far enough upward into the pipette 1.3, by which means the operating element 18 is not displaced into the pipetting position in the middle of the first housing slot 60 above the second housing slot 61. The position of the operating element 18 pivoted to the side in the first housing slot 60 prevents pipetting.

According to FIG. 13*c*, a pipette tip 66.3 cannot be used with the pipette 1.3. This is because the top end of the plunger rod 80.3 pushes the first sensing element 44 up, in order to displace the locking sleeve 51 into the locked position. At this time, however, the spigot 4 is pressed together by the bead 75.3 so that the locking sleeve 51 does not arrive at the locked position and therefore blocks the further rotational movement of the rotating sleeve 33 and of the operating element 18. Due to this, the operating element 18 also remains in a side position between the ejection position and pipetting position within the first housing slot 60, which also prevents pipetting.

According to FIG. 13*d*, the pipette tip 66.2 is shoved onto the spigot 4 and presses the fourth sensing element 62 against the upper hard stop. The bead 75.2 does not engage in the annular groove 8 and the plunger rod 80.2 is too short to push up the first sensing element 44. Consequently, the operating element 18 is not displaced within the housing slot 60 into the pipetting position in the middle above the second housing slot 61. The clamping spring 30 does not engage in the clamping groove 83.2. Pipetting is not possible.

According to FIG. 13*e*, the pipette tip 66.4 is clamped onto the pipette 1.3, wherein the bead 75.4 with the groove 8 and the clamping spring 30 is snapped onto the clamping groove 88.4. However, the plunger rod 80.4 is too short to push the first sensing element 44 far enough up to displace the operating element 18 within the first slot 60 into the pipetting position in the middle above the second slot 61. The locking sleeve 51 is not displaced into the locked position, either. Overall, pipetting is prevented in this way.

According to FIG. 14*a*, a pipette tip 66.1 having a nominal volume of 10 µl is mounted on the pipette 1.1 for pipetting volumes up to 100 µl. In the starting position, the top end of the plunger rod 80.1 projects upward over a certain length relative to the bead 75.1 of the tip cylinder 67.1. Relative to the bead 75.1, the collar 72.1 of the pipette tip 66.1 projects upward over a length that is specific for the pipette tip 66.1 having a nominal volume of 10 µl.

According to FIG. 14*b*, a pipette tip 66.3 having a nominal volume of 100 µl is mounted on the pipette 1.1. With regard to the pipette tip 66.3, the top end of the plunger rod 80.3 stands at the same height above the bead 75.3 as the pipette tip 66.1. The collar 72.3 of the pipette tip 66.3 projects upward from the bead 75.3 over a length that is specific to the pipette tip 66.3.

In FIGS. 14*c, d* and *e*, the pipette tips 66.2, 66.4 and 66.5 are clamped onto the pipette 1.1. However, the plunger rods 80.2, 80.4, 80.5 are too short so that pipetting is not possible for the reasons stated with regard to FIG. 13*e*.

According to FIG. 15*a*, a pipette tip 66.2 having a nominal volume of 25 µl is mounted on the pipette 1.2 for pipetting samples with a volume up to 250 µl. The top end of the plunger rod 80.2 of the pipette tip 66.2 is arranged at a certain length below the bead 75.2. The collar 72.2 of the pipette tip 66.2 projects upward from the bead 75.2 over a length that is specific to the pipette tip 66.2.

According to FIG. 15*b*, a pipette tip 66.4 having a nominal volume of 250 µl is mounted on the pipette 1.2. In the starting position, the top end of the plunger rod 80.4 of the pipette tip 60.4 is arranged at the same length below the bead 75.4 as the pipette tip 66.2. The collar 72.4 of the pipette tip 66.4 projects upward relative to the bead 75.4 by a length that is specific to the pipette tip 66.4.

According to FIGS. 15*c*, 15*d*, 15*e*, the bead 75.1, 75.3, 75.5 of the pipette tips 66.1, 66.3, 66.5 does not engage in the annular groove 8 so that pipetting is not possible for the reasons stated with regard to FIG. 13*b*. Here, the collar 72.1 of the pipette tip 66.1 has pushed the fourth sensing element 62 against the hard stop.

Furthermore, the plunger rods 80.1, 80.3 and 80.5 of the pipette tips 66.1, 66.3 and 66.5 are each too long so that pipetting is not possible for the reasons stated with regard to FIG. 13*c*.

The ejection apparatus 31 and the locking apparatus 50 are components of a mechanical control apparatus 88 coupled to the first sensing element 44, which control apparatus 88 places the pipette 1 into a state that enables pipetting or does not enable pipetting depending on the sensed plunger rod 80.

Figures 8, 9, 10:
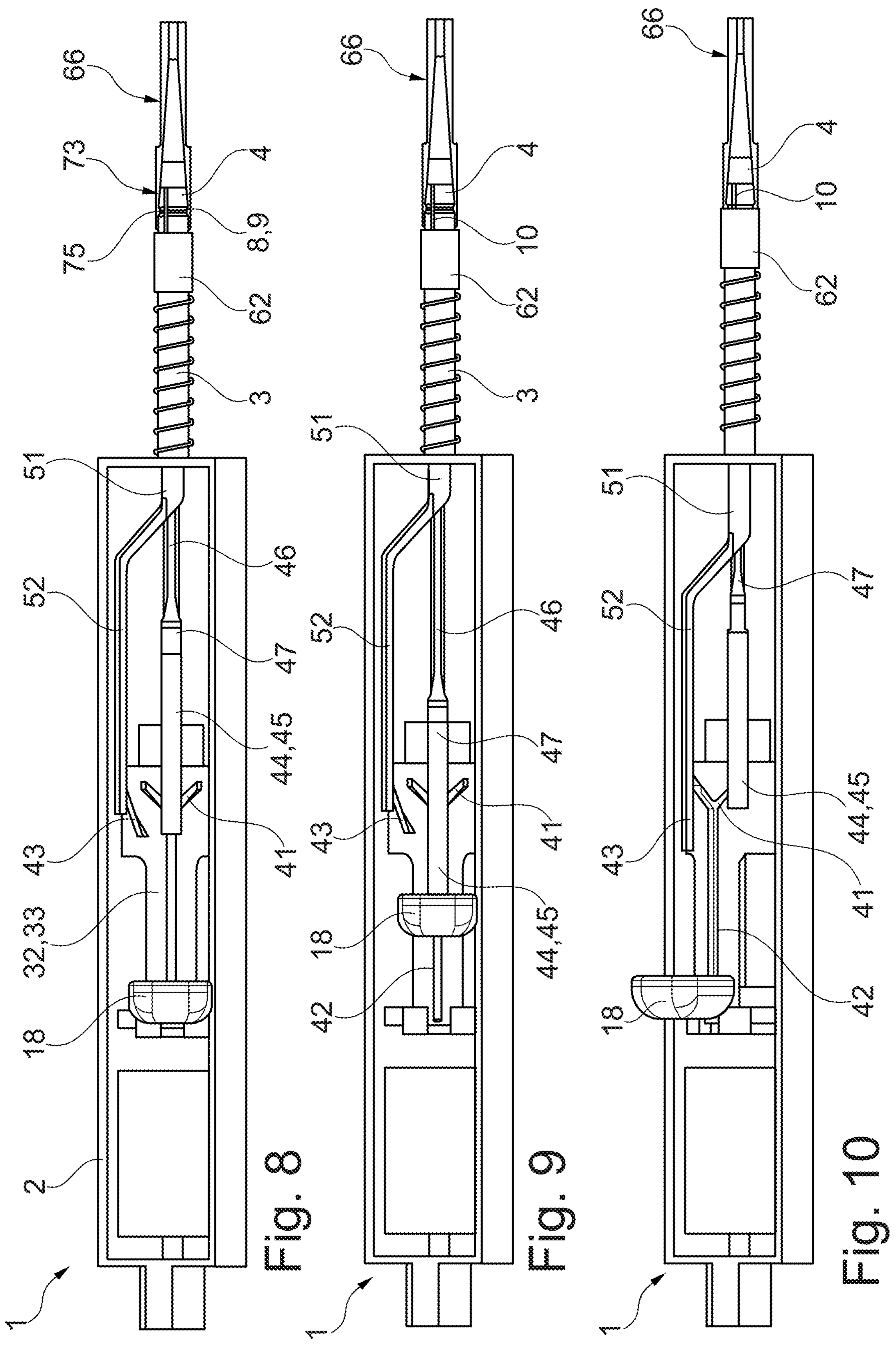
FIG. 8 illustrates a partial cut-away elevational view of the embodiment of FIG. 7 in the starting position.
FIG. 9 illustrates a partial cut-away elevational view of the embodiment of FIG. 7 during pipetting.
FIG. 10 illustrates a partial cut-away elevational view of the embodiment of FIG. 7 during ejection.

The pipette 1 can be used as follows:

According to FIGS. 1 and 8, a pipette tip 66 is held on the pipette 1 in a starting state. The seating region 87 is in particular connected to the spigot 4 in a form-fitting manner by the bead 75 engaging in the annular groove 8. The operating element 18 is located in the starting position at the top end of the second housing slot and can be screwed into the first housing slot in both directions. The maximum angle of rotation is limited by the extent of the first and second grooves 41, 43 in the circumferential direction, or of the first housing slot, depending on which extent is smaller.

According to FIG. 4, the locking sleeve 51 is arranged in the deepest position so that it prevents the pipette tip 66 from unintentionally releasing from the spigot 4. For the form-fit connection to be released, a radial constriction of the spigot 4 would in fact be necessary, however in this position the locking sleeve 51 does not permit such radial constriction. The tip plunger 68 with the upper rod part 82 is securely clamped in the seat 27 of the stroke rod 17.

The fourth sensing element 62 is pressed against the upper edge of the pipette tip 66 by the pretensioned helical spring 63. The position of the fourth sensing element 62 depends on the height of the collar 72 of the mounted pipette tip 66 or on the length by which the collar 72 projects relative to the bead 75. The height of the collar 72 is characteristic for the nominal volume of the pipette tip 66 used. The fourth sensing element 62 is coupled to a panel or another range adjusting apparatus on the counter 65 by a slider omitted in the drawing or another transmission apparatus. Consequently, the counter 65 displays the volume that can be pipetted with the respective mounted pipette tip 66 considering the stroke adjusted by means of the operating element 18. Embodiments of the pipette that have a sensing apparatus for sensing the height of the collar of the pipette tip and embodiments of a pipette tip family wherein the pipette tips of different types (e.g., having different nominal volumes) have collars of different heights are described in the European Patent Application EP 18 168 763.3.

To draw liquid, the pipette 1 is immersed in a liquid with the bottom end of the pipette tip 66 held thereon. Then the operating element 18 is again pressed downward. This movement is converted by the transmission apparatus 15 into a stroke movement of the stroke rod 17. As a result, the tip plunger 68 is displaced upward. In so doing, the rod part 82 entrains the first sensing element 44 so that the first guide pin 49 slides upward in the vertical part 42 of the Y-shaped first groove 41. During this, the locking sleeve 45 retains its position. This is shown in FIG. 9.

Once the operating element 18 has executed the set stroke, the pipette tip 66 is filled with a certain quantity of liquid. Then the operating element 18 is relieved and is displaced back upward by the spring apparatus up to the support ring 56. To discharge this quantity of liquid, the pipette 1 with the pipette tip 66 can be oriented to another vessel. By again pressing the operating element 18 downward, the stroke rod 17 is displaced downward, and the quantity of liquid is discharged. In so doing, the first guide pin 49 slides downward to the node point of the first groove 41.

The stroke executed by the operating element 18 while drawing and discharging liquid depends on the set quantity of liquid. Drawing and discharging liquid can be performed multiple times.

To eject the pipette tip 66, the operating element 18 in the starting position is swung to the right or to the left to an ejection position. In this way, the rotating sleeve 33 is rotated so that the second groove 43 displaces the second guide pin 55, and therefore the locking sleeve 51, upward until the locking sleeve 51 has released the spigot 4 to such an extent that it can be deformed radially inward. To accomplish this, preferably the locking sleeve 51 is pulled out of the through-bore 5. Furthermore, by the rotation of the rotating sleeve 33, the first guide pin 49 is displaced downward in one of the two lateral sections of the lower part of the first groove 41 so that the first sensing element 44 presses against the tip plunger 68 that is supported at the bottom at the tip section 78. In so doing, the bead 75 exerts a radial force on the spigot 4 so to constrict it, and the form-fit connection between pipette tip 66 and spigot 4 is released. In this way, the pipette tip 66 is released from the spigot 4. This is shown in FIG. 10. The scraping of the pipette tip 66 off the spigot 4 can be assisted by the fourth sensing element 62 that is pressed by the pretensioned helical spring 63 against the upper edge of the pipette tip 66.

Once the used pipette tip 66 is released from the spigot 4, a new pipette tip 66 can be connected to the spigot 4. To accomplish this, the pipette 1 can be inserted with the spigot 4 into the mounting opening 71 of a pipette tip 66 provided in a support. In so doing, the fourth sensing element 62 is displaced upward and pretensions the helical spring 63. In this way, the display of the counter 65 is set to the mounted pipette tip 66. Furthermore, the upper rod part 82 presses against the bottom of the first sensing element 44 so that the first guide pin 49 slides up to the first branching point of the first groove 41. In so doing, the rotating sleeve 33 is rotated in the pipette housing 2 until the operating element 18 is located in the pipetting position. At the same time, the second guide pin 55 slides in the second groove 43 to the low point. This displaces the locking sleeve 51 into the locked position in FIG. 4 in which it prevents the pipette tip 66 from releasing from the spigot 4.

Connecting the tip plunger 68 to the stroke rod 17 and pipetting can be carried out in the above-described manner.

Figure 16:
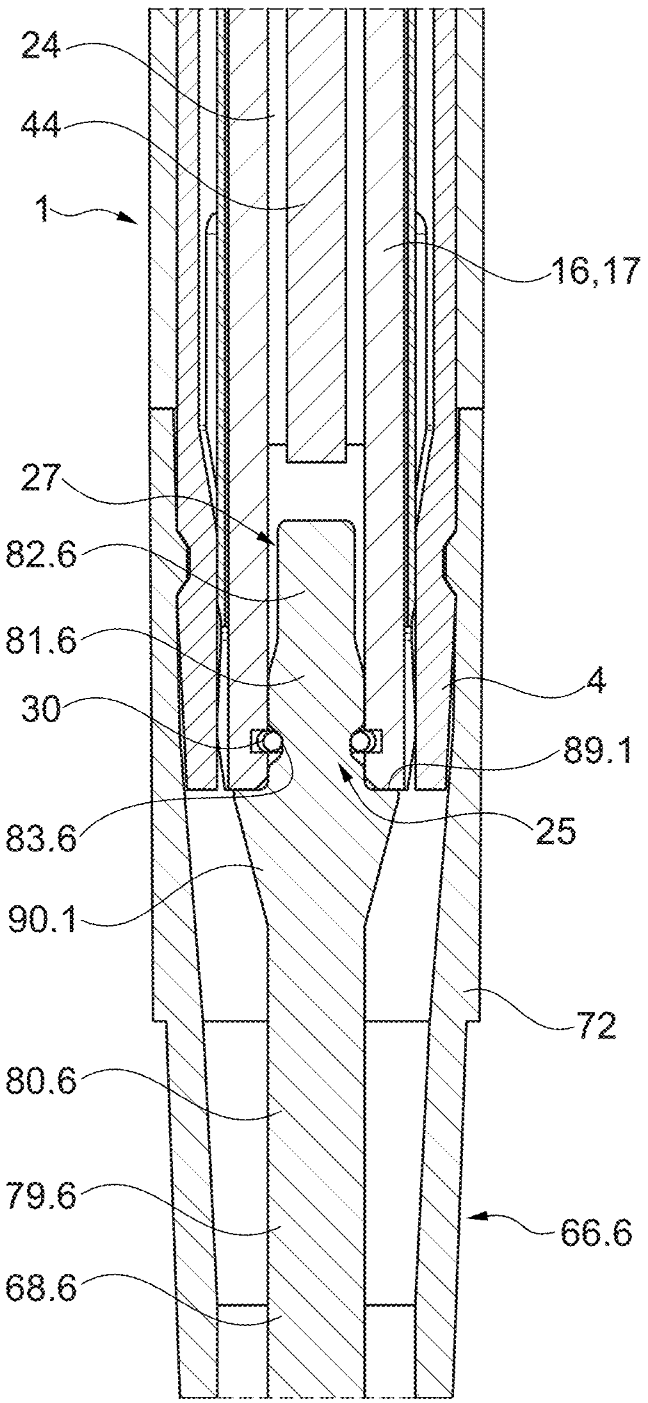
FIG. 16 illustrates a longitudinal section of a bottom end of an embodiment of the direct displacement pipette with a pipette tip having a hard stop mounted on the spigot.

FIG. 16 shows a pipette tip 66.6 that differs from the pipette tip 66.5 in FIG. 15*e* in that the plunger rod 80.6 has a hard stop 89.1 under the clamping groove 83.6 at the bottom end of the lower rod part 81.6. The hard stop 89.1 is formed by the top of a conical section 90.1 expanding upward. Alternatively, the hard stop 89.1 is formed by the top of a disc or by a plurality of outwardly projecting projections distributed at the same height over the circumference of the plunger rod 80.6.

The hard stop 89.1 is positioned so that the plunger rod 80.6 can be shoved far enough into the seat 27 that the clamping spring 30 engages in the clamping groove 83.6. By arranging the hard stop 89.1 on the edge of the hole 25, the plunger rod 80.6 is prevented from being shoved farther into the seat 27. It is only possible to pull the tip plunger 68.6 out of the seat 27 by overcoming the clamping force of the clamping spring 30. Consequently, the tip plunger 68.6 is held by the stroke rod 17 so that it cannot be shifted upwards or downwards. This prevents pipetting errors while drawing and discharging the liquid.

Figure 17:
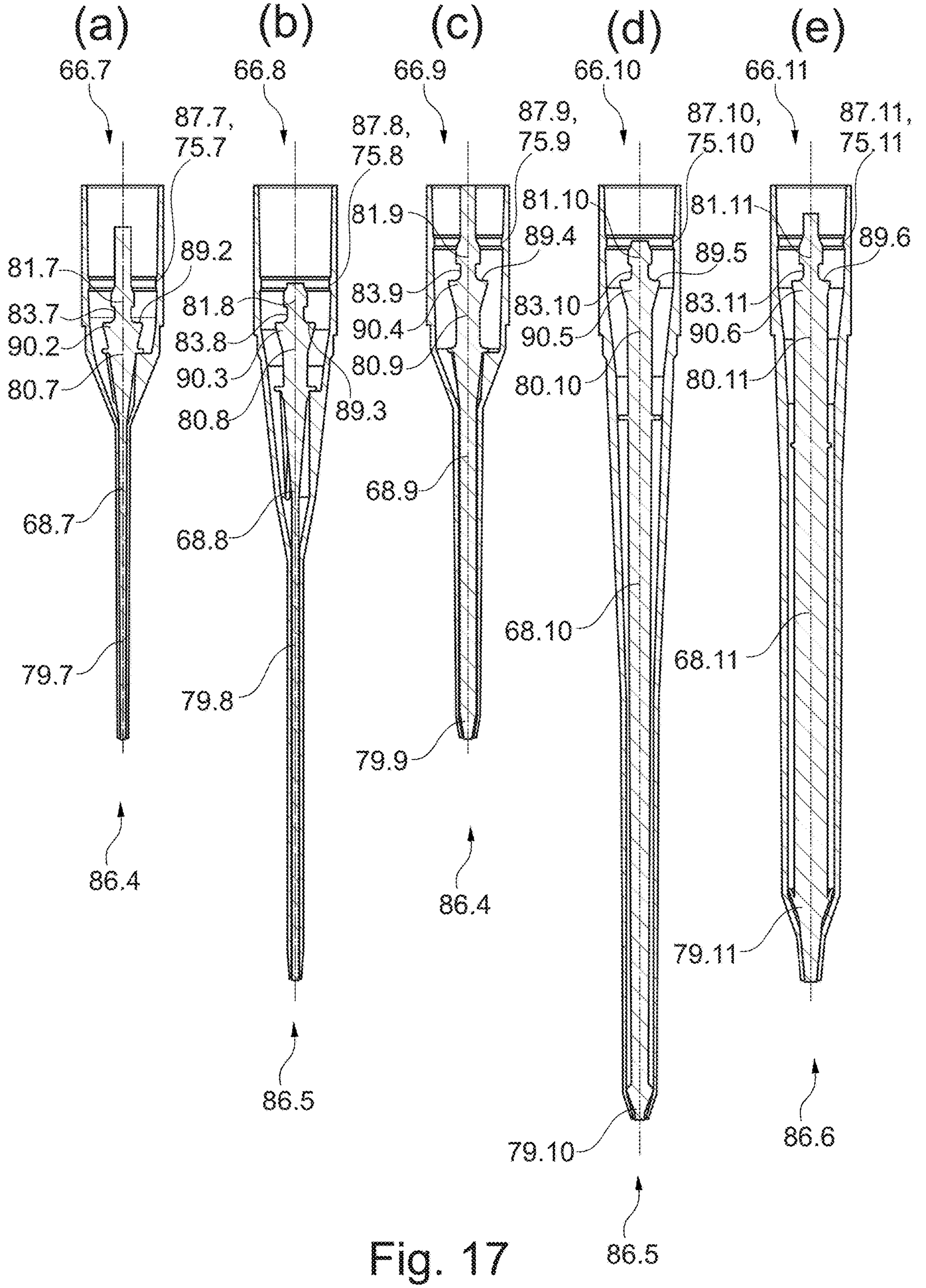
FIG. 17*a* illustrates a longitudinal section of an embodiment of a pipette tip with a nominal volume of 10 µl.
FIG. 17*b* illustrates a longitudinal section of an embodiment of a pipette tip with a nominal volume of 25 µl.
FIG. 17*c* illustrates a longitudinal section of an embodiment of a pipette tip with a nominal volume of 100 µl.
FIG. 17*d* illustrates a longitudinal section of an embodiment of a pipette tip with a nominal volume of 250 µl.
FIG. 17*e* illustrates a longitudinal section of an embodiment of a pipette tip with a nominal volume of 1000 µl.

According to FIG. 17, a pipette tip family comprises five different pipette tip types. These are pipette tip types 66.7 to 66.11 with three different nominal volumes of 10 µl (FIG. 17*a*), 25 µl (FIG. 17*b*), 100 µl (FIG. 17*c*), 250 µl (FIGS. 17*d*) and 1,000 µl (FIG. 17*e*). In all pipette tips 66.7 to 66.11 from FIG. 17, the tip plunger 86.7 to 86.11 is in a position in which it is shoved as deep as possible into the tip cylinder 67.7 to 67.11.

The pipette tips 66.7 to 66.11 substantially differ from the pipette tips 66.1 to 66.5 in that the plunger rods 80.7 to 80.11 have wide annular grooves 83.7 to 83.11 instead of the narrow clamping grooves 83.1 to 83.5. Furthermore, the plunger rods 80.7 to 80.11 have clamping grooves 83.7 to 83.11 at the bottom end of the lower rod part 81.7 to 81.11, each of which has a hard stop 89.2 to 89.6. Each hard stop 89.2 to 89.6 simultaneously forms a lower delimitation of the annular groove 83.7 to 83.11 arranged above it. The hard stops 89.2 to 89.6 are each formed by the top of a conical section 90.2 to 90.6 expanding upward. Alternatively, the hard stops 89.2 to 89.6 are formed by the top of a disc or by a plurality of outwardly projecting projections distributed at the same height over the circumference of the plunger rod 80.7 to 80.11.

The tip plungers 68.7 to 68.11 are configured so that they can be form-fittingly connected to a stroke rod 17 that has a plurality of slots on the bottom end, wherein the segments of the stroke rod 17 remaining between the slots form inwardly projecting hooks that are formed and dimensioned to snap into the clamping grooves 83.7 to 83.11 on the plunger rods 80.7 to 80.11. A stroke rod 17 and its interaction with a tip plunger is described in particular in FIGS. 12*a*, 13 and 14 of DE 10 2020 118 587.1.

The plunger rods 80.7 to 80.11 can be inserted into the axial bore 24 of the stroke rod 17 until the hard stop 89.2 to 89.6 abuts the bottom end of the stroke rod. The hooks then engage in the annular groove 83.7 to 83.11. This prevents the plunger rod 80.7 to 80.11 from being inserted further into the stroke rod. It is only possible to pull the tip plunger 68.7 to 68.11 out of the seat by overcoming the spring force of the bottom end of the stroke rod 17. If the pipette is equipped with a locking sleeve according to DE 10 2020 118 587.1, the plunger can only be released from the stroke rod 17 if the locking sleeve is displaced upward from the locked position to a released position. This holds the tip plunger 68.7 to 68.11 immovably on the stroke rod 17 and prevents pipetting errors while drawing and discharging the fluid.

As in the pipette tips in FIG. 12, the different nominal volumes are identified by the different heights of the collar 72.7 to 72.11 of the tip cylinder 67.7 to 67.11 in the pipette tips in FIG. 17. The height of the collar 72.7 to 72.11 is given as the distance from the bead 75.7 to 75.11 to the upper edge of the collar.

As in the pipette tips in FIG. 12, in the pipette tips of the same subfamily in FIG. 17, the top ends of the plunger rods 80.7 to 80.11 in the deepest position of the tip plunger 68.7 to 68.11 occupy the same positions above the seating region 87.7 to 87.11 as are defined by the circumferential bead 75.7 to 75.11. Therefore the pipette tips 66.7, 66.9 having a nominal volume of 10 µl and 100 µl form a first subfamily 86.4 wherein the top ends of the plunger rods 80.7, 80.9 in the deepest position occupy the same position above the bead 75.7, 75.9.

Furthermore, the pipette tips 66.8, 66.10 having a nominal volume of 25 µl and 250 µl form a second subfamily 86.5 wherein the top ends of the plunger rods 80.8, 80.10 in the deepest position of the tip plunger 68.8, 68.10 occupy the same position at the same height as the bead 75.8, 75.10.

Finally, the pipette tip 66.11 having a nominal volume of 1,000 µl forms a third subfamily 86.6 that only consists of a single family member. In this subfamily 86.6, the top end of the plunger rod 80.11 in the deepest position of the tip plunger 68.11 is located above the bead 75.11, specifically only about half as far above the bead as the pipette tips 66.7, 66.9 of the subfamily 86.4.

LIST OF REFERENCE SIGNS

1 Pipette
2 Pipette housing
3 Shaft
4 Spigot
5 Through-bore
6 Upper spigot section
7 Lower spigot section
8 Annular groove
9 Clamping region
10 Slot
11 Slot
12 Drive direction
13 Transmission element
14 Transmission rod
15 Transmission mechanism
16 Drive element
17 Stroke rod
18 Operating element
19 Operating lever
20 Bar
21 Support plate
22 First curved slot
23 First edge cutout
24 Axial bore
25 Hole
26 Longitudinal slot
27 Seat
28 Clamping spring groove
29.1 Clamping slot
29.2 Clamping slot
30 Clamping spring
31 Ejection apparatus
32 Curved support
33 Rotating sleeve

34 Cutout
35 Cutout
36 Base
37 Sector
38 Sector
39 First curve
40 Second curve
41 First groove
42 Vertical part
43 Second groove
44 First sensing element
45 Upper ejection rod section
46 Lower ejection rod section
47 Connecting rod section
48 Second sensing element
49 First guide pin
50 Locking apparatus
51 Locking sleeve
52 Control rod
53 Second connecting rod section
54 Third sensing element
55 Second guide pin
56 Support ring
57 Jacket
58 Second curved slot
59 Second edge cutout
60 First housing slot
61 Second housing slot
62 Fourth sensing element
63 Helical spring
64 Adjustment knob
65 Counter
66 Pipette tip
67 Tip cylinder
68 Tip plunger
69 Body
70 Tip opening
71 Mounting opening
72 Collar
73 Connection region
74 Lower connection section
75 Bead
76 Upper connection section
77 Plunger travel path
78 Tip section
79 Plunger
80 Plunger rod
81 Lower rod part
82 Upper rod part
83 Clamping groove
84 Disc
85 Ledge
86 Subfamily
87 Seating region
88 Control apparatus
89 Hard stop
90 Conical section

The invention claimed is:

1. A pipette tip family comprising:

a plurality of different pipette subfamilies;

a plurality of pipette tips configured to be used with different pipettes of a pipette family, wherein each of the pipettes comprise a spigot, wherein each of the plurality of pipette tips comprises, a tip cylinder comprising, a hollow body including a bottom end and a top end, wherein the bottom end defines a tip opening and the top end defines a mounting opening, a seating region configured to clamp to the spigot, and a cylindrical plunger travel path defined between the tip opening and the seating region, a tip plunger comprising, a plunger sealingly guided in the plunger travel path, and a plunger rod comprising a top end and projecting upward, wherein the plunger rod is configured to clamp to one of the pipettes, wherein at least two of the plurality of pipette tips are grouped into each of the plurality of different pipette subfamilies, wherein each of the pipette tips in a same pipette subfamily has the top end of the plunger rod arranged at a same position relative to the seating region while the tip plunger is in the respective lowest position; and wherein the pipette tips of different pipette subfamilies have the top ends of the plunger rods arranged at different positions relative to the seating region while the tip plungers are in the respective lowest positions, wherein in the respective lowest position, the tip plunger rests against the tip cylinder and is inhibited from being pushed deeper into the tip cylinder, and wherein the plurality of pipette tips of each pipette subfamily are configured to be used for pipetting with pipettes of a pipette type matched thereto and are not configured to be used with pipettes of a pipette type not matched thereto, wherein the seating region of the plurality of pipette tips comprises a circumferential bead on an inner circumference of the tip cylinder, wherein the plurality of pipette tips comprise at least one pipette tip of at least a first pipette tip type of a first pipette subfamily, wherein when the tip plunger is in the respective lowest position, the top end of the plunger rod is positioned in a first position above the circumferential bead on the inner circumference of the tip cylinder for use with pipettes matched to a first pipette type, wherein the plurality of pipette tips comprise at least one pipette tip of at least a second tip type of a second pipette subfamily, wherein when in the respective lowest position of the tip plunger, the top end of the plunger rod is positioned in a second position below the circumferential bead arranged on the inner circumference of the tip cylinder for use with pipettes matched to a second pipette type, wherein the plurality of pipette tips comprise at least one pipette tip of a third tip type of a third pipette subfamily, wherein when the tip plunger is in a the respective lowest position of the tip plunger, the top end of the plunger rod is arranged in a third position between the first and second positions for use with pipettes matched to a third pipette type.

2. The pipette tip family according to claim 1, wherein the plurality of pipette tips of different tip types differ from one another by a nominal volume.

3. The pipette tip family according to claim 1, wherein each of the plurality of pipette tips comprises a collar with the mounting opening in the top end and the seating region on an inner circumference of the collar.

4. The pipette tip family according to claim 1, wherein the plurality of pipette tips of at least one of the pipette subfamilies are of different tip types, wherein each of the plurality of pipette tips comprises a collar defining a characteristic height for a corresponding different tip type, wherein the plurality of pipette tips are configured to be clamped with at the seating region onto the inner circumference of the collar on the same clamping region of a spigot of a pipette of a same pipette type, wherein the collars of each of the plurality of pipette tips stand at different heights on the spigot.

5. The pipette tip family according to claim 1 wherein the nominal volume of each of the plurality of pipette tips of different tip types of at least one of the pipette subfamilies differ from one another by one or more decimal powers.

6. The pipette tip family according to claim 1 wherein the seating region of the plurality of pipette tips is configured for snap-fit connection with the spigot of a pipette.

7. The pipette tip family according to claim 1, wherein the pipette tips of the first subfamily comprise a nominal volume of 10 µl and 100 µl, wherein the pipette tips of the second subfamily comprise a nominal volume of 25 µl and 250 µl and are configured for use with the second pipette type, and wherein the pipette tips of the third subfamily comprise a nominal volume of 1000 µl and are configured for use with pipettes of the third pipette type.

8. The pipette tip family according to claim 1, wherein at least one of, (1) the plunger rod of each of the plurality of pipette tips comprises a circumferential clamping groove below the top end configured to securely clamping at least one clamping element disposed on a stroke rod, (2) the plunger rod of each of the plurality of pipette tips comprises a lower rod part comprising a larger outer diameter configured to securely clamp a clamping element positioned on a stroke rod and an upper rod part comprising a smaller diameter than the lower rod part so that the upper rod part cannot be securely clamped by the clamping element of the stroke rod, and (3) below one of a clamping groove and the lower rod part, the tip plungers comprise a hard stop configured to prevents the plunger rod from being pressed so deeply into the seat of the stroke rod.

* * * * *